(12) United States Patent
Honkura et al.

(10) Patent No.: US 6,336,064 B1
(45) Date of Patent: Jan. 1, 2002

(54) MAGNETIC APPARATUS FOR DETECTING POSITION OF VEHICLE

(75) Inventors: Yoshinobu Honkura; Hideki Fujii; Aki Watarai; Kako Eiji, all of Tokai (JP)

(73) Assignee: Aichi Steel Works, Ltd., Tokai (JP)

( * ) Notice: Subject to any disclaimer, the term of this patent is extended or adjusted under 35 U.S.C. 154(b) by 0 days.

(21) Appl. No.: 09/508,675

(22) PCT Filed: Sep. 28, 1998

(86) PCT No.: PCT/JP98/04348

§ 371 Date: Mar. 28, 2000

§ 102(e) Date: Mar. 28, 2000

(87) PCT Pub. No.: WO99/17079

PCT Pub. Date: Apr. 8, 1999

(30) Foreign Application Priority Data

Sep. 29, 1997 (JP) ............................................. 9-263939

(51) Int. Cl.[7] .............................................. G06F 15/50
(52) U.S. Cl. ......................... 701/23; 180/167; 180/168
(58) Field of Search ................................. 180/167, 168, 180/169; 701/23, 301

(56) References Cited

U.S. PATENT DOCUMENTS

| | | | |
|---|---|---|---|
| 5,191,528 A | * | 3/1993 | Yardley et al. ............... 701/23 |
| 5,202,742 A | * | 4/1993 | Frank et al. .................. 356/5.1 |
| 5,347,456 A | | 9/1994 | Zhang et al. .................. 701/23 |
| 5,369,591 A | * | 11/1994 | Broxmeyer .................. 701/301 |

FOREIGN PATENT DOCUMENTS

| | | |
|---|---|---|
| JP | 8-161707 | 6/1996 |
| JP | 9-184727 | 7/1997 |

* cited by examiner

Primary Examiner—William A. Cuchlinski, Jr.
Assistant Examiner—Marthe Y. Marc-Coleman
(74) Attorney, Agent, or Firm—Jacobson Holman, PLLC

(57) ABSTRACT

A magnetic apparatus for detecting a position of a vehicle, capable of detecting a lateral deviating distance of a vehicle over a lateral deviation width with a high accuracy and at a high speed, wherein a magnetic field component in the direction of advance of the vehicle is detected; or more preferably a three dimensional magnetic sensor (1), which comprises a magnetic sensor element for the direction of advance of the vehicle, and magnetic sensor elements for two directions crossing the first-mentioned direction and provided additionally, is used, whereby it becomes possible to heighten a center retaining capability of the vehicle, widen a lateral deviating distance detecting range around four times from around 25 cm to around 1 m, and detect a magnetic marker (3) reliably even when disturbance magnetic field exerts influence upon this detection operation to thereby start center side guidance reliably.

13 Claims, 24 Drawing Sheets

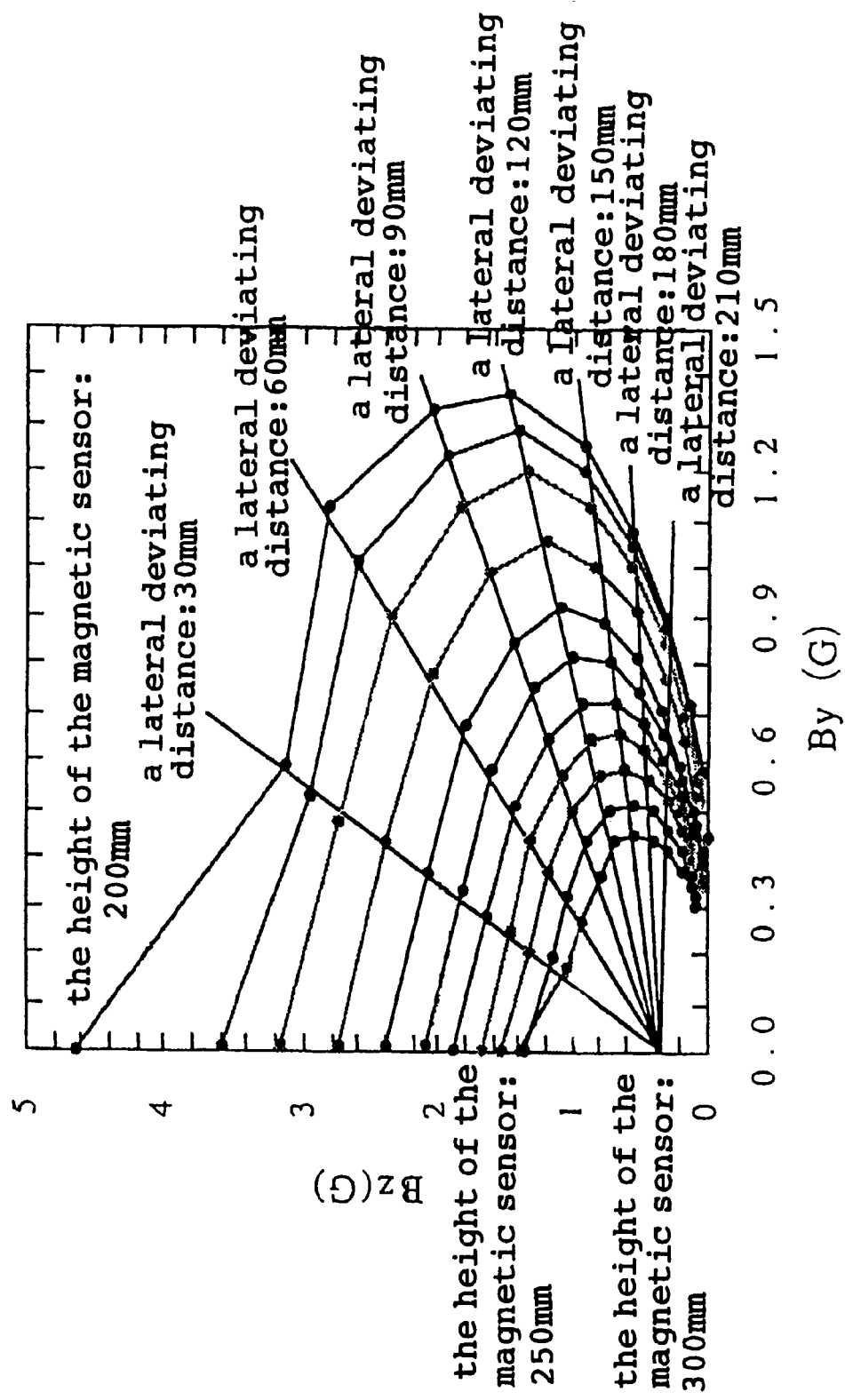

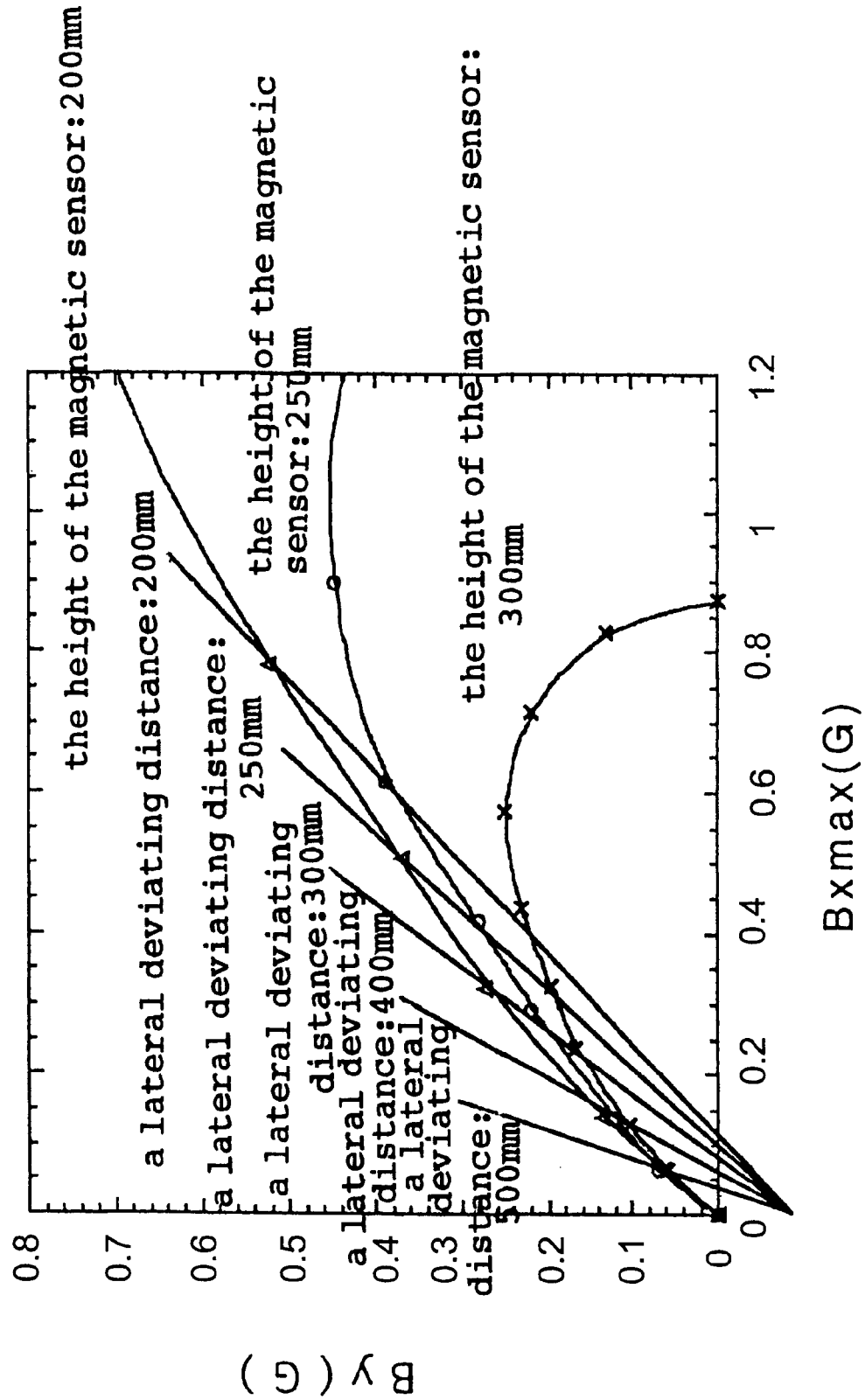

MAGNETIC APPARATUS FOR DETECTING POSITION OF VEHICLE

FIELD OF THE INVENTION

The present invention relates to a magnetic apparatus for detecting a position of a vehicle that calculates a lateral deviating distance of a vehicle from the centerline on the road by detecting a magnetic field generated from magnetic markers located on the centerline of the road.

BACKGROUND OF THE INVENTION

An automatic driving system has been researched by various approaches. The principles for these approaches are to detect a cable with current by a pickup coil, to analyze a figure by camera, to use radiowaves, to use an ultrasonic device, to detect magnetic tape by a magnetic sensor and so on. However, these methods, except magnetic methods, are difficult to apply to vehicles running on the road in bad weather (rain, snow, mist and so on). The magnetic methods in which linearly arrayed sensors detect a magnetic line is usually adopted to an automatic driving system used in a plant, but it is difficult for arrayed sensors to apply to guiding vehicles on roads because of high speed and vertical oscillation.

U.S. Pat. No. 5,347,456 discloses a magnetic guiding method for vehicles. According to this method, a magnetic sensor set on a vehicle detects both vertical component and transverse component of a magnetic field and then a lateral deviating distance is calculated from this data accompanied with the correction of the vertical oscillation of the vehicle.

However, the vertical component of the magnetic field considerably decreases when the magnetic sensor is set at a height of more than about 20 cm to 25 cm. So the detectable range of the lateral deviating distance is very narrow at about 20 cm to 25 cm. Therefore it is noted that the magnetic guiding system does not operate when a vehicle does not enter into the area within about 20 cm to 25 cm from the center of the road.

As usual a vehicle is correctly guided within about 20 cm to 25 cm from the centerline of the road. But the problem remains that the vehicle deviates from the centerline over 25 cm and becomes out of control when the vehicle is running through bridges or tunnels because they are made of reinforced concrete that generate the magnetic field. The external magnetic field is locally as strong as the magnetic field generated from magnetic markers. Here the word 'external' means 'except things by magnetic markers'.

For example, the vehicle is running 20 cm distant from the centerline to the right. In this situation the magnetic sensor of the vehicle detects the right directed component of the magnetic field generated from magnetic markers located in the centerline. If the left directed component of the external magnetic field is larger than the right directed component of the magnetic field generated from markers, the computer misjudges that the vehicle is running on the left side of the lane. From this misjudgment the computer guides the vehicle toward the right.

The magnetic markers are set along the centerline at the interval of 2 m. However there is the case that the vehicle deviates at distance of about 25 cm from the centerline while it goes about 1 m. In this undesirable case, the guiding system easily becomes out of control. Here the maximum of steering angle of 5 degrees, the vehicle width of 1.7 m and the lane width of 3.5 m are assumed.

The maximum of the distance between the magnetic marker and the magnetic sensor is 0.9 m in these above assumptions. If the magnetic guiding system has the detectable range of about 1 m, the magnetic sensor can detect the magnetic marker always when the vehicle is on the lane. That means that the system certainly and correctly guides the vehicle toward the centerline. But the above-mentioned system has the detectable range of only about 25 cm. The range is insufficient.

Moreover in running on a curve, a lateral deviating distance varies at the point of every magnetic marker. It is necessary to detect the deviating distance from the centerline while a vehicle goes 2 m. And the above-mentioned system uses so complex method to calculate the position of vehicle that the system needs long time to identify the position of the vehicle.

It is desirable that the interval of magnetic markers is shorter than 2 m. In order to solve this problem, the new magnetic guiding system is expected. It must be able to easily detect the lateral deviating distance with high accuracy in spite of the interval of 2 m for markers.

This invention is made in order to solve the above problem. The subject of this invention is to provide the magnetic apparatus for detecting position of vehicle that can detect the lateral deviating distance from centerline with wide detectable range, high accuracy and short response time.

SUMMARY OF THE INVENTION

Disclosure of the Invention

To solve this problem, the inventors found out a new method to enhance the ability of the sensor for keeping a position of a vehicle on the centerline and to extend the detectable range of the sensor for the lateral deviating distance from 25 cm to 1 m. The detectable range becomes 4 times larger. The method is characterized by detecting the longitudinal component of the magnetic field. The longitudinal component means along the lane. Moreover it is favorable to detect three components of the magnetic field. Three components are the longitudinal component, the vertical component and the transverse component. In this method, when the lateral deviating distance between the sensor and the marker becomes over 25 cm because of the misjudgment brought by external magnetic field, the system certainly and correctly guides the vehicle toward the centerline and recovers the vehicle at the center position of the lane.

The Following are Details of this Invention.

A magnetic apparatus for detecting position of the vehicle detects a lateral deviating distance between the vehicle and the centerline (correctly between the magnetic sensor and magnetic markers) using the measured value for the longitudinal component of the magnetic field.

As after mentioned the appreciative magnetic apparatus for detecting position of the vehicle comes true by this system. This apparatus can detect accurately the lateral deviating distance with wide detectable range compared to the conventional apparatus that detects not the longitudinal component but the other components of the magnetic field.

The magnetic apparatus for detecting a position of a vehicle is characterized by detecting the lateral deviating distance using the largest variation of the longitudinal component of the magnetic field.

Here, the largest variation is the difference between the maximum output signal and the minimum output signal of the magnetic sensor that detects the longitudinal component of the magnetic field. The largest variation is dependent on the lateral deviating distance.

This method makes it possible to detect accurately the lateral deviating distance.

The magnetic apparatus for detecting a position of a vehicle is characterized by detecting the lateral deviating distance using Lx. Here, Lx is defined as the distance obtained by multiplying a vehicle's speed together with the period from the minus peak time to the plus peak time of a Bx output signal. The plus or minus peak time means the time to get the maximum or minimum output signal of the magnetic sensor respectively. Lx is dependent on the lateral deviating distance. This method makes it possible to detect accurately the lateral deviating distance.

The magnetic apparatus for detecting a position of a vehicle is characterized by detecting the lateral deviating distance using three components of the magnetic field. The above three components are detected by the vertical magnetic sensor, the transverse magnetic sensor and the longitudinal magnetic sensor. This method makes it possible to detect more accurately the lateral deviating distance, when the lateral deviating distance is small. In other words, the vertical magnetic sensor detects the component normal to the lane plane, and the transverse magnetic sensor detects the component parallel to right-and-left direction of the vehicle.

The magnetic apparatus for detecting a position of a vehicle is characterized by detecting the lateral deviating distance using the vertical and transverse components measured at the moment when the longitudinal component reverses from plus to minus. This method makes it possible to detect accurately the lateral deviating distance.

The magnetic apparatus for detecting a position of a vehicle is characterized by detecting the lateral deviating distance using the peak values or the average values of the vertical component and the transverse component. Here, the average value is defined as the average of the peak values and the values at the moment when the longitudinal component reverses from plus to minus. This method makes it possible to detect accurately the lateral deviating distance.

The magnetic apparatus for detecting a position of a vehicle is characterized by detecting the lateral deviating distance using three different combinations of three components according to the lateral deviating distance.

The magnetic apparatus for detecting position of vehicle provided in the claim 7 comparing with that of claim 4 is characterized by detecting the lateral deviating distance using different three combinations of three components according to the lateral deviating distance.

When the lateral deviating distance is large, both the longitudinal component and the vertical component are used. The longitudinal component provides the lateral deviating distance and the transverse component shows whether the vehicle is running on the left side or on the right side.

Next when the lateral deviating distance is medium, both the longitudinal component and the vertical component are used in the similar manner, accompanying with the correction of the vertical oscillation.

And when the lateral deviating distance is small, both the transverse component and the vertical component are used. The lateral deviating distance is obtained by both components accompanied with the correction of the vertical oscillation and the transverse component shows whether the vehicle is running on the left side or on the right side.

This method makes it possible to detect accurately the lateral deviating distance with wide detectable range. Especially when the lateral deviating distance is large, this method can enhance the accuracy of detection.

The magnetic apparatus for detecting a position of a vehicle is characterized by using frequency bands of the signal from magnetic markers eliminating other frequency bands from noises. The accuracy of detection can be enhanced.

The magnetic apparatus for detecting a position of a vehicle is characterized by calculating the longitudinal position of a magnetic marker from the output signal of the longitudinal magnetic sensor. This method makes it possible to detect accurately the longitudinal position of a magnetic marker.

The magnetic apparatus for detecting a position of a vehicle is characterized by calculating the longitudinal position of a magnetic marker from three detected peak values of three components, that is, a longitudinal one, a transverse one and a vertical one.

Then the apparatus calculates a midpoint between a current marker passing at the moment and a next marker with calculated positions of some previous markers. From a magnitude of the magnetic field on this midpoint, the apparatus calculates a level of the background magnetic field except the magnetic field from magnetic markers (the signal magnetic field), especially detects a level of the external magnetic field with a long period. Then the apparatus derives the signal magnetic field from the values detected by the magnetic sensor by subtracting this background magnetic field.

The magnetic apparatus for detecting a position of a vehicle is characterized by the method eliminating a noise generated from the short period external magnetic field. The type of the noise can be eliminated by using both values of the lateral deviating distance derived from the current marker passing at this time and the average distance derived from some continual previous magnetic markers. This method can enhance the accuracy of detection.

The magnetic apparatus for detecting a position of a vehicle is characterized by equipping the means to detect information about the road with various configurations of magnetic markers. This method can make the apparatus multifunctional. For example, in a dense fog the apparatus informs a driver about the bumpiness, curve, and incline rate in a road.

The magnetic apparatus for detecting a position of a vehicle is characterized by equipping the means to calculate a velocity of a vehicle with the time to pass the space between adjacent magnetic markers. This method makes it possible to detect a velocity of a vehicle without the addition of the speed sensor.

The magnetic apparatus for detecting a position of a vehicle is characterized by steering control with the derived lateral deviating distance. This method can make the automatic driving safe and comfortable.

(The Account of the Principle to Calculate the Lateral Deviating Distances by Using the Three-dimensional Magnetic Sensor)

The Detecting Method (1)

The method to detect a small lateral deviating distance.

The method uses the vertical component of the magnetic field, Bz, when a lateral deviating distance is small (for example within 25 cm ). Because the output of Bz is much larger than that of the other two components near the center of the magnetic marker, and sharply decrease with increase of a lateral deviating distance. The method makes it possible to measure a lateral deviating distance with accuracy of about 2 cm. Besides the transverse component of the magnetic field, By, shows whether a vehicle is running on the left side or right side of a lane. Because the By output voltage of the magnetic sensor on left side from a magnetic marker shows the different sign from that of the magnetic sensor on right side from a magnetic marker.

When it is necessary to correct influence of the height of the magnetic sensor, the map shown in FIG. 6 is used for calculating a lateral deviating distance. This map is composed of the vertical component maximum of the magnetic field (which is called as Bzmax) and the transverse component maximum of the magnetic field (which is called as Bymax) using two parameters, the height of the magnetic sensor and the lateral deviating distance.

Besides in any lateral deviating distance, the maximum of Bz is obtained at the moment when the magnetic sensor passes over or abeam the magnetic marker. Similarly, the maximum of By is obtained at the moment when the magnetic sensor is over or abeam the magnetic marker. As mentioned above, Bz is the vertical component of the magnetic field and By is the transverse component of the magnetic field.

The lateral deviating distance can be calculated directly by using the map shown in FIG. 6. The lateral deviating distance can be calculated also by using one simple equation that is derived from the one-to-one relation between a lateral deviating distance and a ratio of Bzmax to Bymax shown in FIG. 7.

The Detecting Method (2)

The method to detect a medium lateral deviating distance.

The method uses the transverse component of the magnetic field, By, and the longitudinal component of the magnetic field, Bx when a lateral deviating distance is medium about from 25 cm to 50 cm.

The output signal of the transverse component of the magnetic field, By, has a one-to-one correspondence to a lateral deviating distance in the case that a lateral deviating distance is above 10 cm. Moreover the transverse component of the magnetic field, By, spreads far and wide. To use the transverse component makes it possible to measure a lateral deviating distance with accuracy of about 4 cm. However, it is difficult to distinguish the transverse component of the magnetic field generated from the magnetic marker from the transverse component of the external magnetic field. The reason is that the latter noise interferes with the former signal, and the sign of By output signal keeps before and after a vehicle pass through a magnetic marker.

On the other hand, although the longitudinal component of the magnetic field, Bx also spreads far and wide, the sign of output signal changes before and after a vehicle pass through a magnetic marker. So it is easy to distinguish the longitudinal component of the magnetic field of magnetic markers from the longitudinal component of the external magnetic field. Therefore it is suitable to combine Bx and By for measuring a lateral deviating distance from 25 cm to 50 cm.

When it is necessary to remove affect of a height of the magnetic sensor, the map shown in FIG. 8 is used. The coordinates of the points in the map for Bxmax and Bymax show both values of a height of the magnetic sensor and a lateral deviating distance. Using the map, a lateral deviating distance is calculated with correction of the obtained height of the magnetic sensor. Besides a lateral deviating distance can be obtained directly from the map shown in FIG. 8 and can be calculated by using one simple equation that is derived from the one-to-one relation between a lateral deviating distance and a ratio of Bxmax to Bymax shown in FIG. 9.

The Detecting Method (3)

The method to detect a large lateral deviating distance.

The method uses the transverse component of the magnetic field, By, and the longitudinal component of the magnetic field, Bx in the case of a large lateral deviating distance from 50 cm to 100 cm. The method can obtain accurately a lateral deviating distance by calculating the longitudinal distance between the Bx maximum point and the Bx minimum point as shown in FIG. 10 and FIG. 24. Here the Bx maximum point and Bx minimum point mean the points at which Bx show maximum and minimum values respectively. In this case, whether the vehicle is running on left or right side from the centerline of the road is judged from the sign of the transverse component of the magnetic field, By. This method can neglect the influence of the height of the magnetic sensor. Speaking repeatedly, Bx is the transverse component of the magnetic field, and By is the transverse component of the magnetic field. By the way, FIG. 10 is obtained from computer simulation and FIG. 24 is obtained from an experiment. The assumption for this simulation and experiment is that the magnetic marker has the diameter of 100 mm and the thickness of 5 mm. And it is set over 250 mm from the upper surface of the magnetic marker.

The Detecting Method (4)

Another method to detect a large lateral deviating distance.

The method can get a lateral deviating distance by using the map (refer to FIG. 25) that shows the relation between calculated Bxmax and a lateral deviating distance in a large lateral deviating distance from 30~40 cm to 100 cm. Here Bxmax is defined as the gap between the maximum value of Bx and the minimum value of Bx. As shown in FIG. 25, Bxmax is only a little dependent on a height of the magnetic sensor in this lateral deviating distance. Therefore a lateral deviating distance is calculated accurately and quickly without correcting the affect of a height of the magnetic sensor. By the way, in the same manner of method (3), whether the vehicle is running on left or right side from the centerline of the road is judged from the sign of the transverse component of the magnetic field, By.

When a lateral deviating distance is large, the method (4) can detect a lateral deviating distance by using Bxmax more accurately compared to the method (3) to detect it by using the longitudinal distance between the Bx maximum point and the Bx shows minimum point.

However, the output signal of Bxmax is remarkably dependent on the height of the magnetic sensor when a lateral deviating distance is within 30 cm, as shown in FIG. 25. Therefore in this area, the method (4) to detect a lateral deviating distance by using Bxmax requires the correction to remove the affect of the height of the magnetic sensor. So it is possible to select a suitable method among method (1)NH~method (3) for detecting a not large lateral deviating distance and adopt method (4) for detecting a large lateral deviating distance.

Another Detecting Method (5)

Moreover it is possible to calculate a lateral deviating distance from the transverse component of the magnetic field By roughly. In this case, the influence of the vertical oscillation of the magnetic sensor is neglected. It is possible to select Bx or By for detecting a lateral deviating distance according to circumstances. Moreover, it is possible to use the average value of two detected lateral deviating distances. One is detected by using Bx and the other is detected by using By.

However, it is desirable to use Bxmax not By for detecting a lateral deviating distance. Here Bxmax is the gap between the maximum value of Bx and the minimum value of Bx. The reason is that the magnetic field generated from magnetic marker overlaps with the external magnetic field and using Bx can make it easy to separate the former from the latter. In other words, it is difficult to separate the former from the latter by using By.

(The Account of the Method to Guide a Vehicle Toward the Centerline of the Road)

The following is the explanation of the method for guiding a vehicle toward the centerline.

As mentioned above, the conventional system does not operate when a vehicle does not enter into the area within 25 cm from the centerline. On the other hand, the present method using a variation of Bx can guide a vehicle from any position.

Besides, there are three methods to detect a lateral deviating distance. One only uses Bx. Another uses both Bx and By. The other uses both Bz and By. Selecting a suitable method among these three methods makes it possible to detect accurately a lateral deviating distance, under every condition that a lateral deviating distance is small, medium and large.

For example, a lateral deviating distance from the centerline is 50~100 cm when a vehicle enters to the magnetic guiding lane. So a lateral deviating distance is detected with the method (3) using Bx and By.

Next, when a lateral deviating distance decreases due to guiding with method (3), a lateral deviating distance is detected with the method (2) using Bx and By. And a vehicle is guided toward the centerline according to this detected lateral deviating distance.

Furthermore, when a lateral deviating distance more decreases, a lateral deviating distance is detected accurately with the method (1) using Bx, By and Bz.

Besides, even if a lateral deviating distance becomes over 25 cm, above-mentioned methods can guide a vehicle toward the centerline before a vehicle drive out of the road.

BRIEF DESCRIPTION OF THE DRAWINGS

FIG. 6 shows the line on which a lateral deviating distance is constant, on the two dimensional virtual space composed of By and Bz. This Figure is used in the case of a lateral deviating distance within 25 cm.

FIG. 7 shows a relationship between a lateral deviating distance and the rate of Bz to By.

FIG. 8 shows the line on which a lateral deviating distance is constant, on the two dimensional virtual space composed of Bz and Bxmax. This Figure is used in the case of a lateral deviating distance from 25 cm to 50 cm.

DETAILED DESCRIPTION OF THE PREFERRED EMBODIMENTS

Constitution and characteristics of the above-mentioned invention are explained in more detail, referring to the following examples.

EXAMPLE (1)

An example of the present magnetic apparatus for detecting a lateral deviating distance of a vehicle is explained as follows. Here, for detecting a lateral deviating distance, the apparatus equips the three-dimensional magnetic sensor which is composed of three magnetic sensors detecting the longitudinal, transverse and vertical component of the magnetic field respectively.

(The Construction of the Apparatus)

Figure 1:
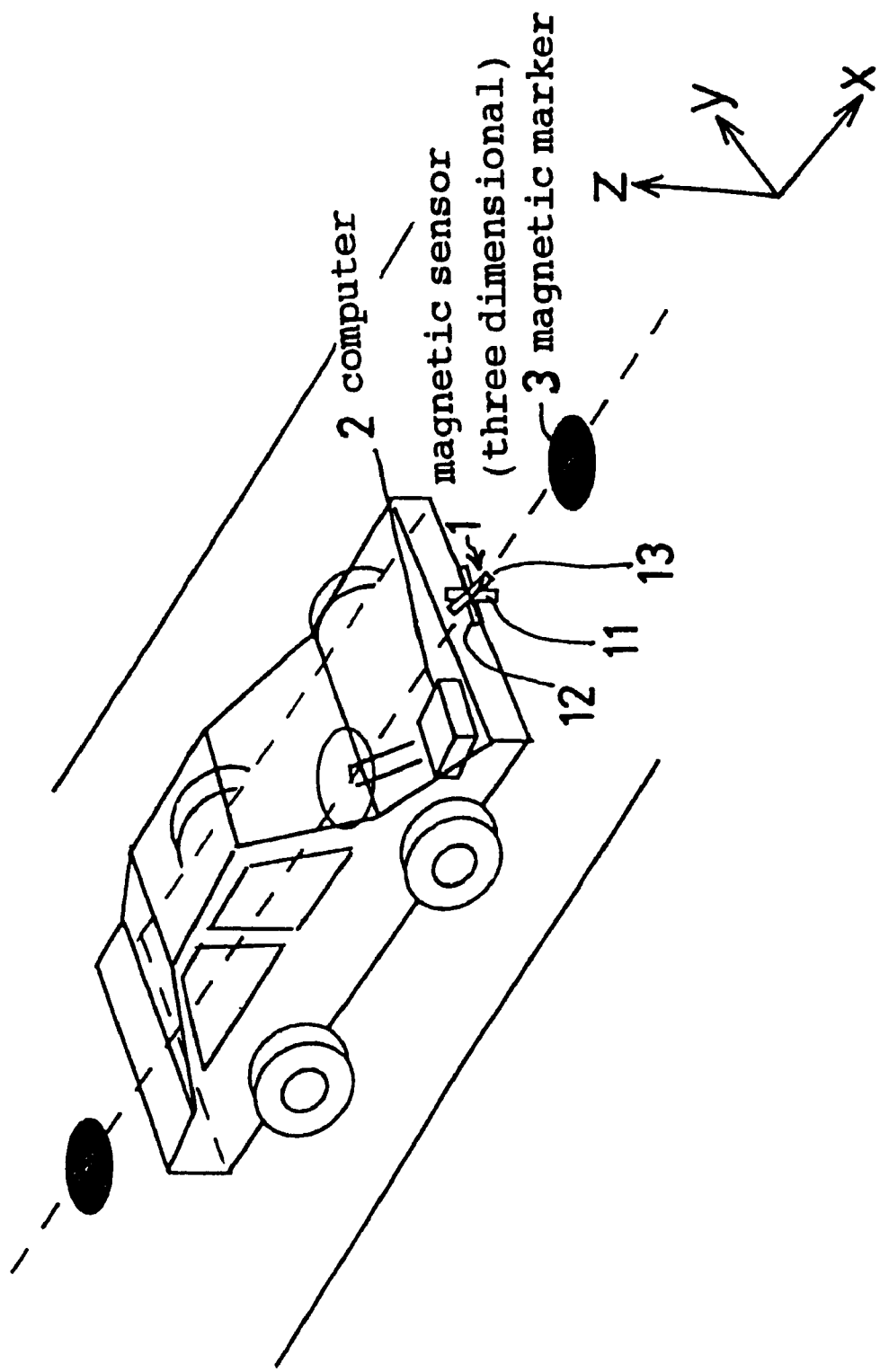
FIG. 1 is a schematic bird's-eye view showing the principle of the invented method used in the magnetic apparatus for detecting a lateral deviating distance.

Here the construction of this magnetic apparatus for detecting a lateral deviating distance of a vehicle is explained referring to FIG. 1.

Figure 2:
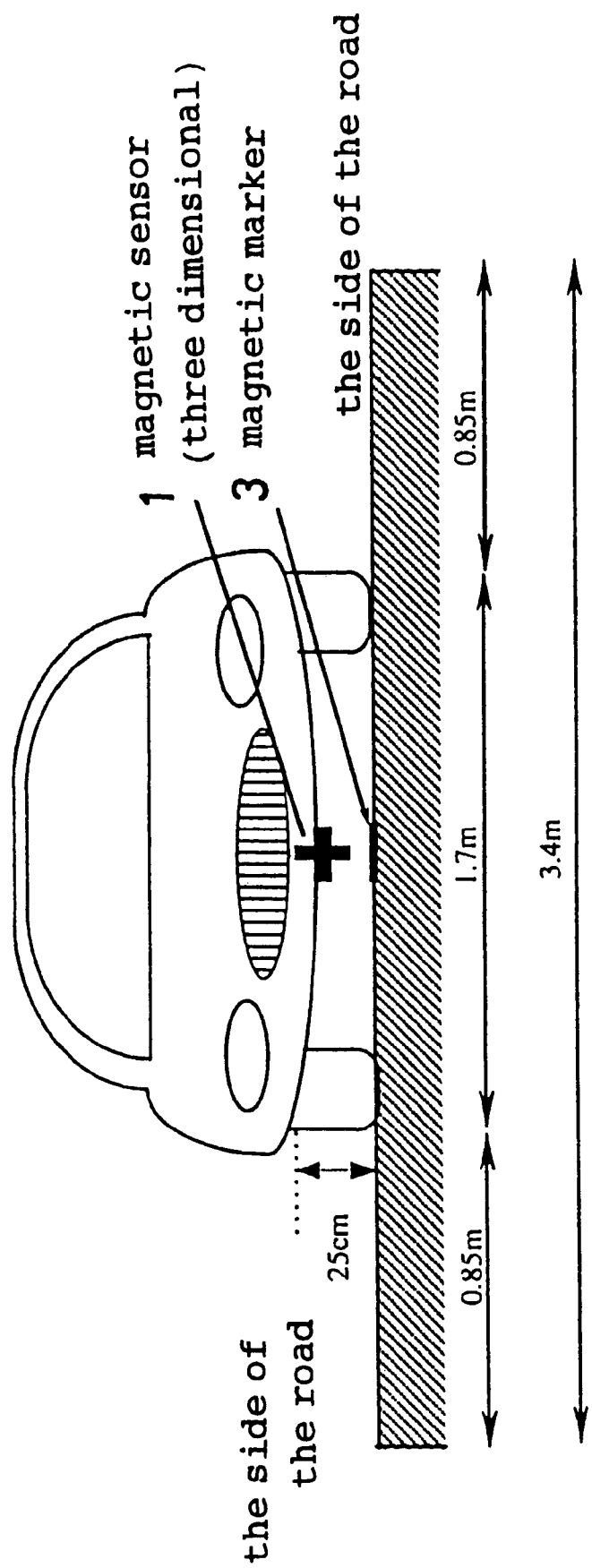
FIG. 2 is a front view showing the location of a magnetic sensor 1 and a magnetic marker 3.

This apparatus is composed of the three-dimensional magnetic sensor 1 set on the bottom surface of the vehicle's front and the computer 2 set in a vehicle. The computer 2 calculates a lateral deviating distance by using the output signal of the three-dimensional magnetic sensor 1. The three-dimensional magnetic sensor 1 is assembled from the three magnetic sensors. One is the vertical magnetic sensor 11 detecting the vertical component of the magnetic field. Another is the transverse magnetic sensor 12 detecting the transverse component. The other is the longitudinal magnetic sensor 13 detecting the longitudinal component. The three-dimensional magnetic sensor 1 is set in height of 25 cm from the surface of the road as shown in FIG. 2.

Magnetic markers 3 are placed along the centerline at a constant interval (for example, 2 m). The magnetic marker 3 is a disk made of a permanent magnet that has a diameter of 100 mm and a thickness of about 5 mm. And the maximum energy product of the magnet is about 16000 J/m3. The top surface of a magnetic marker 3 is magnetized into monopole (for example, north pole).

(A Distribution of the Magnetic Field Around a Magnetic Marker 3)

Figure 3:
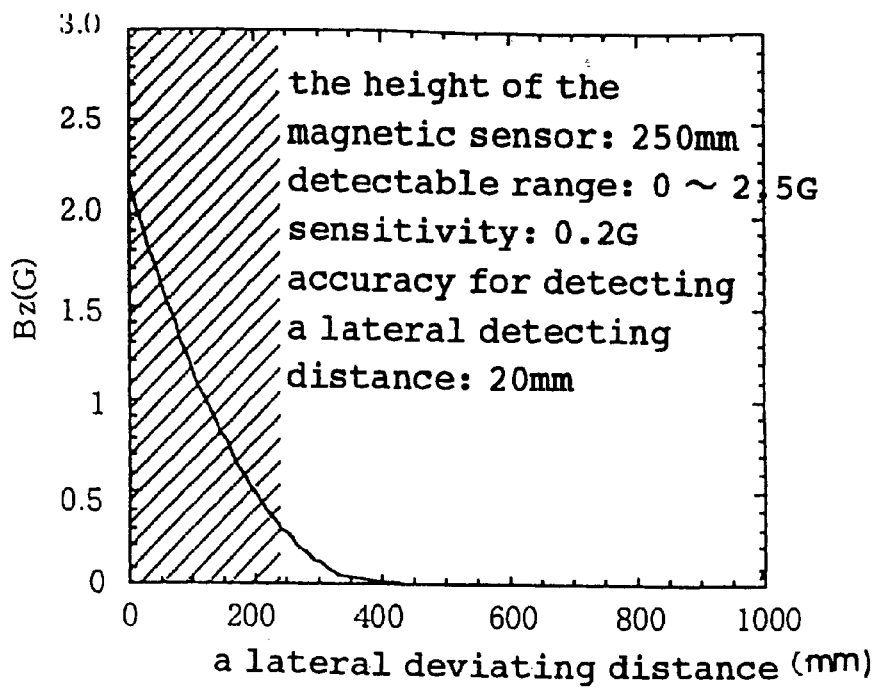
FIG. 3 shows a relationship between a lateral deviating distance and the vertical component of the magnetic field.
Figure 4:
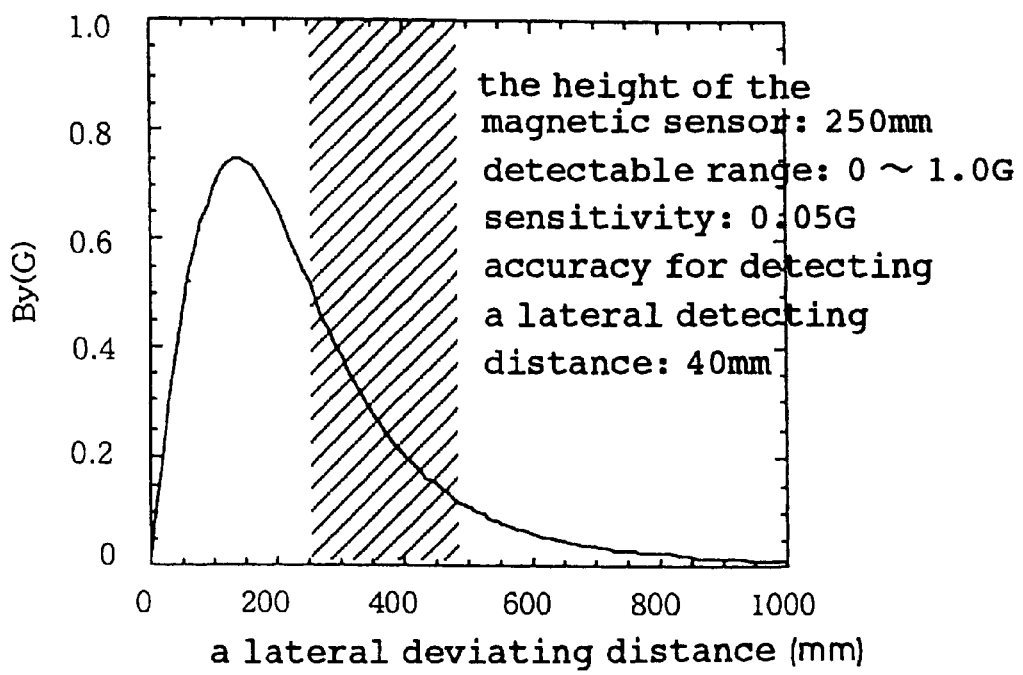
FIG. 4 shows a relationship between a lateral deviating distance and the transverse component of the magnetic field.
Figure 5:
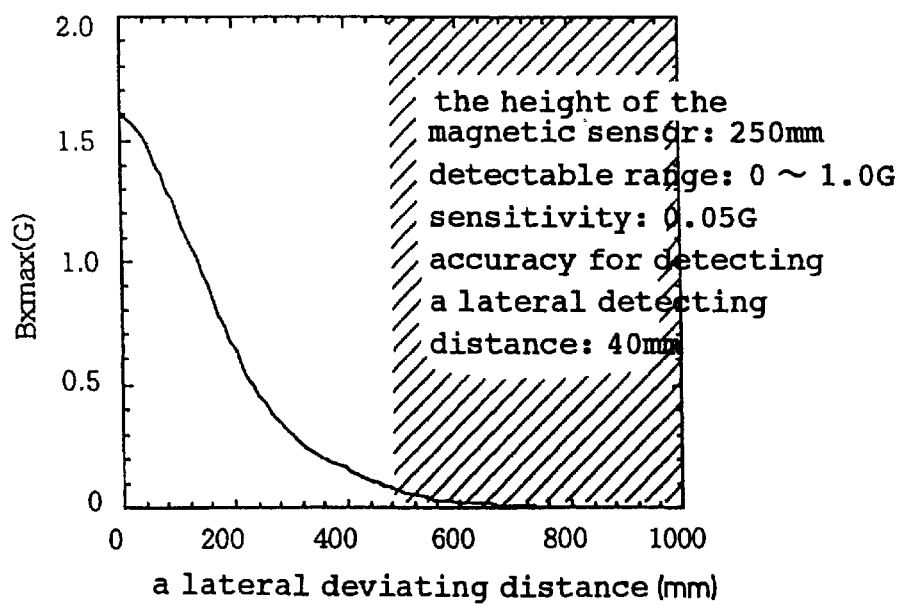
FIG. 5 shows a relationship between a lateral deviating distance and the longitudinal component of the magnetic field.
Figure 7:
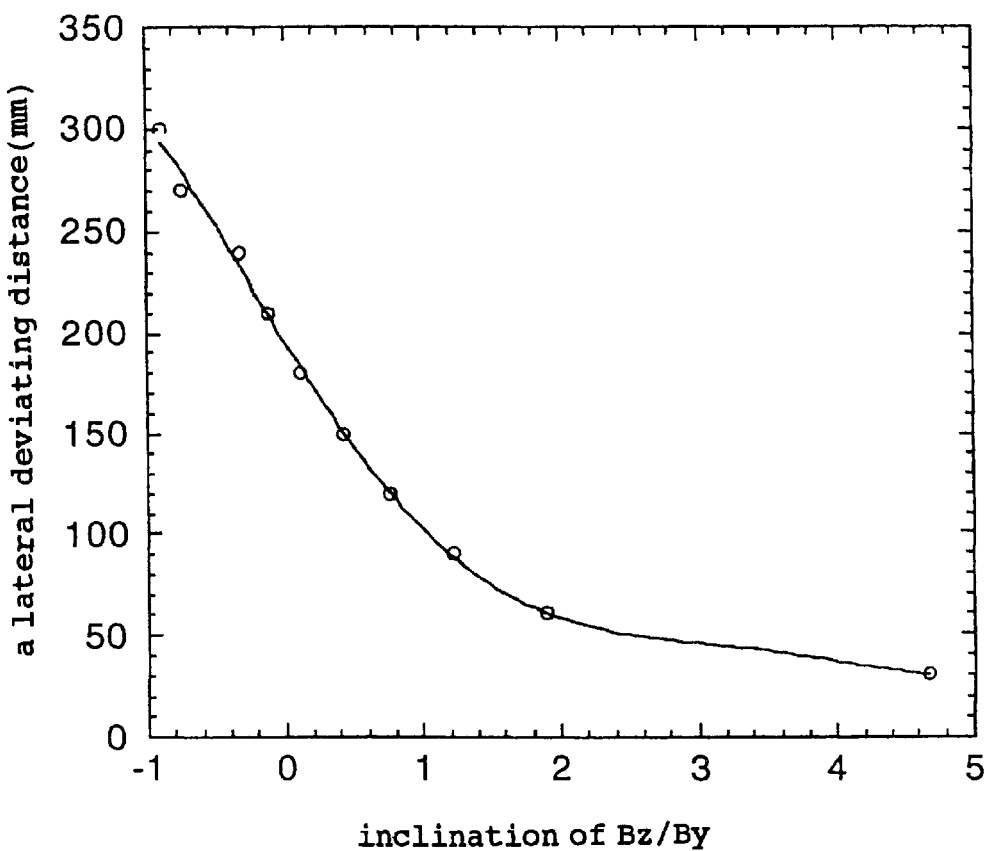
Figure 9:
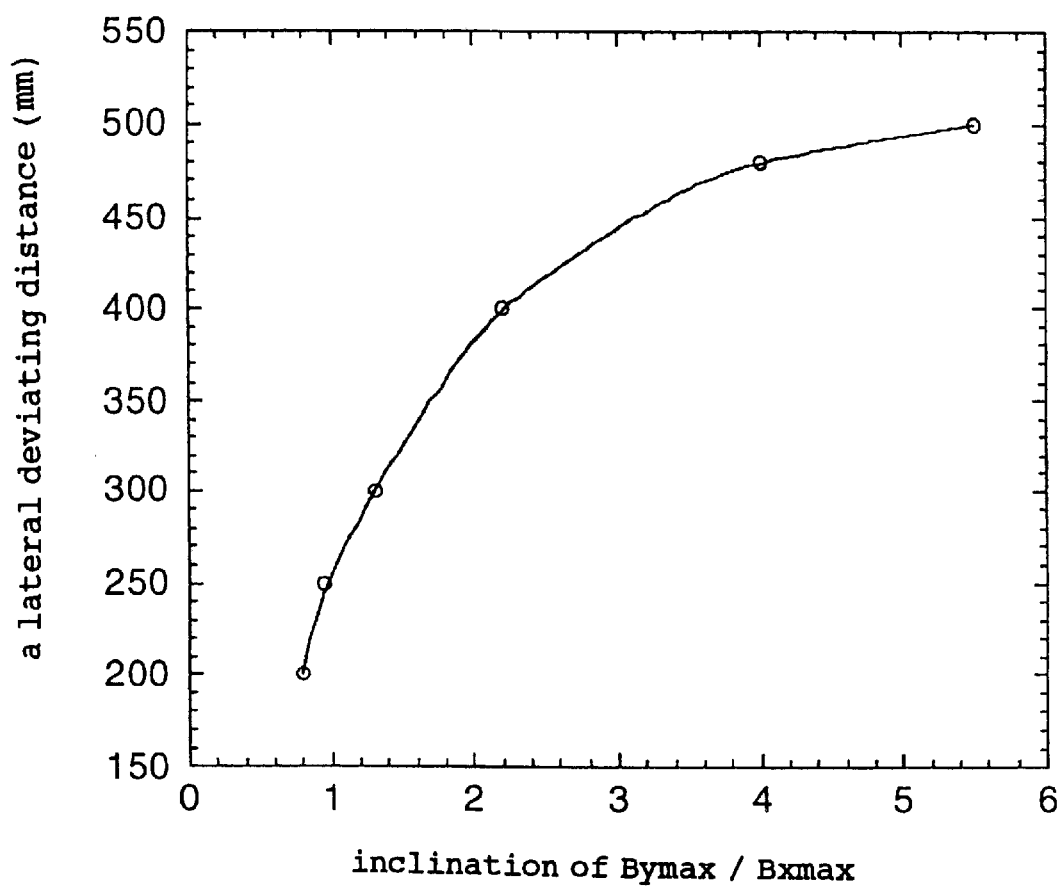
FIG. 9 shows a relationship between a lateral deviating distance and the rate of Bxmax to Bymax.
Figure 10:
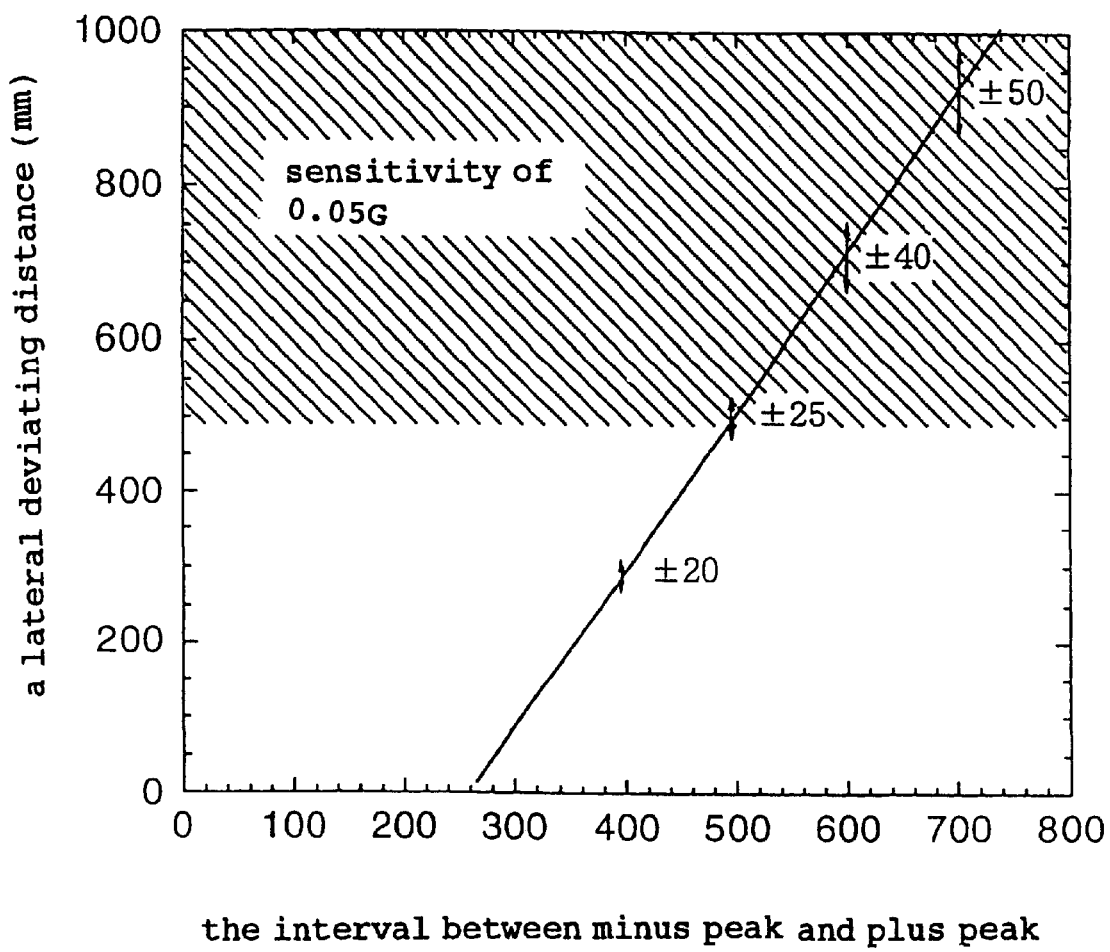
FIG. 10 shows a relationship between a lateral deviating distance and Lx. As mentioned above, Lx is defined as the distance obtained by multiplying a vehicle's speed together with the period from the minus peak time to the plus peak time for a signal of the magnetic sensor. This Figure is used in the case of a lateral deviating distance from 50 cm to 100 cm.
Figure 11:
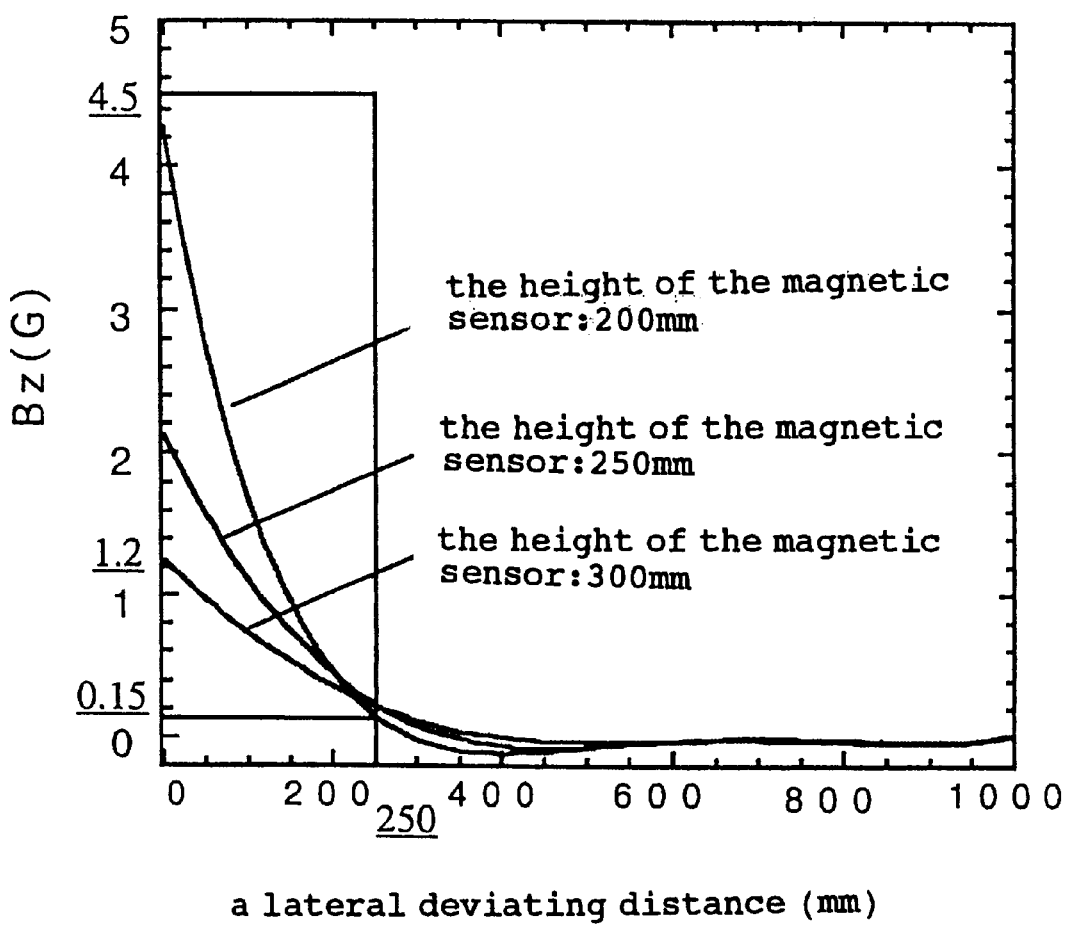
FIG. 11 shows the result of measuring a relationship between a lateral deviating distance and Bz. Bz is the vertical component of the magnetic field.
Figure 12:
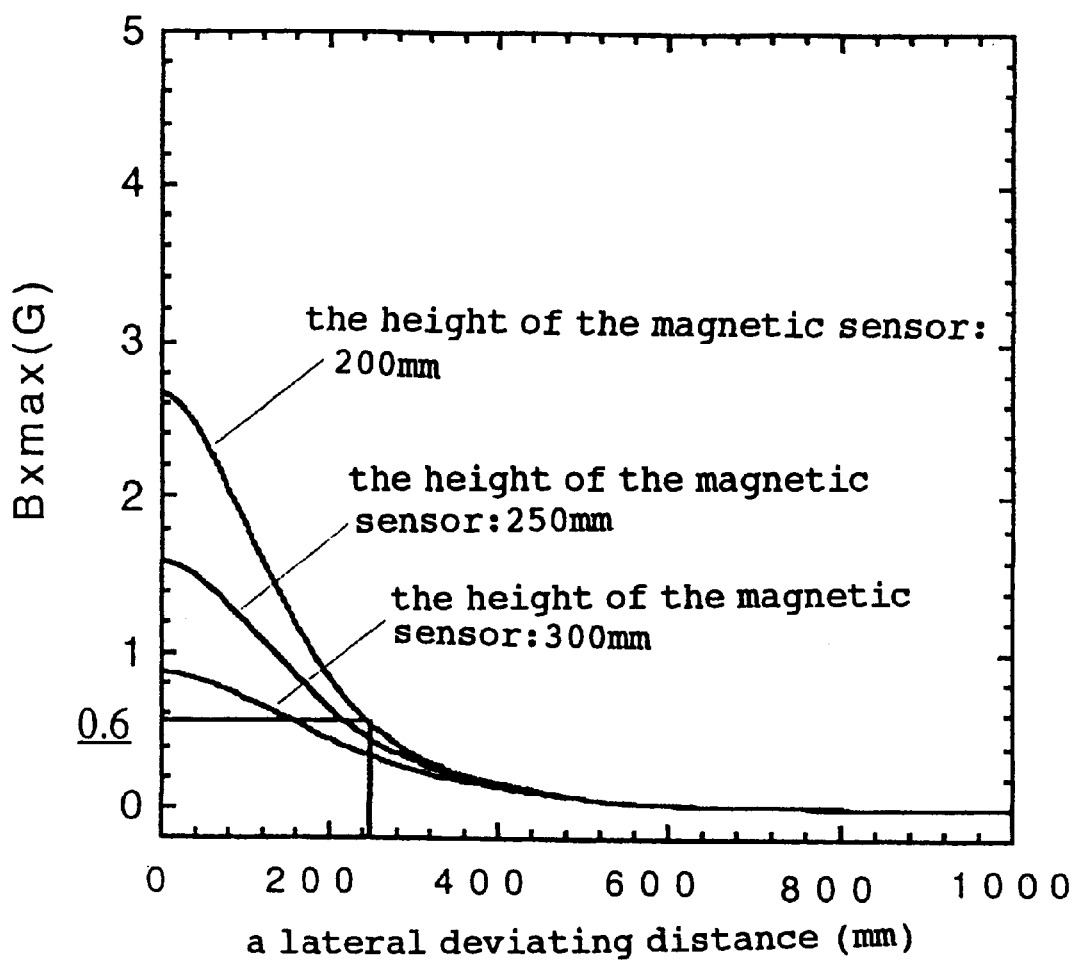
FIG. 12 shows the result of measuring a relationship between a lateral deviating distance and Bxmax, in the case of a lateral deviating distance from 0 to 1000 mm. As mentioned above, Bxmax is defined as the gap between the maximum value of Bx and the minimum value of Bx.

The distribution of the magnetic field around a magnetic marker 3 is explained referring to FIGS. 3~5, where the Bx, By and Bz are shown in G (gauss), that is, 0.0001 T (tesla).

The relation between a lateral deviating distance and Bx detected component of the magnetic field is shown in FIG. 3. Similarly, the relation for By and Bz are shown in FIGS. 4 and 5 respectively. Here the position of the magnetic sensor is 25 cm in height.

Bz distribution is characterized by a sharp peak over a magnetic marker 3, narrow broadening about 25 cm and bilateral symmetry, as shown in FIG. 3. In other words, a large Bz signal is obtained when a lateral deviating distance is within 25 cm, especially large near the centerline, but Bz signal decreases remarkably when a lateral deviating distance is longer than 25 cm.

For example, using the vertical magnetic sensor 11 that has full scale of 0.0005 T and sensitivity of 0.00001 T enables to measure a lateral deviating distance from 0 to 250 mm with the accuracy of 20 mm (refer to FIG. 3). A detected value of Bz at the moment when a vehicle passes through a magnetic marker corresponds to a lateral deviating distance. However, in this case, it is necessary to use the sign of the output signal from the transverse magnetic sensor 12, for judging whether a vehicle is running on left side or right side of the centerline.

By is 0 just over the center of a magnetic marker 3. By distribution is characterized by a peak at 15 cm from the centerline, wide broadening as far as near 1 m and odd-functional distribution, which is shown in FIG. 4. A detected value of By at the moment when a vehicle passes through a magnetic marker corresponds to a lateral deviating distance. By has a detectable range as far as 1 m. And the sign of By output signal can be used for judging whether a vehicle is running on left side or right side of the centerline. However, it is impossible to identify a lateral deviating distance by By output signal. Because the By output signal does not have one-to-one relationship with a lateral deviating distance.

For example, using the transverse magnetic sensor 12 that has full scale of 0.00017 T and sensitivity of 0.0000024 T enables to measure a lateral deviating distance from 250 mm to 500 mm (refer to FIG. 4).

Moreover, distribution of Bx shows same to that of By except direction because of the axial symmetry of the magnetic field generated from the magnetic marker. But the changing of Bx output signal against time is very different from that of By output signal. From the characteristic of the changing of Bx output signal, inventors found out that a lateral deviating distance can be detected by using a variation of Bx, that is, Lx and a lateral deviating distance have a linear relationship. As mentioned above, Lx is defined as the distance obtained by multiplying a vehicle's speed together the period from the minus peak time to the plus peak time of the Bx output signal.

For example, using the longitudinal magnetic sensor 13 that has full scale of 0.00003 T and sensitivity of 0.000001 T enables to calculate a lateral deviating distance from 500 mm to 1000 mm with the accuracy of 100 mm with one simple equation. In this case, a lateral deviating distance as far as 1000 mm can be measured but the detecting accuracy become at most 100 mm. Later, this method using an output signal of the longitudinal magnetic sensor 13 is mentioned in detail.

Besides, there is a one-to-one relationship between Bxmax and a lateral deviating distance. This relationship shows another method to use Bx. Here, Bxmax is defined as the gap between the maximum value of Bx output signal and the minimum value of Bx output signal. The details of this method are mentioned later, too.

The above consideration referring to FIG. 3~FIG. 5 makes a following result. When a lateral deviating distance is shorter than 250 mm, relation between a lateral deviating distance and Bz is used for calculating a lateral deviating distance. When a lateral deviating distance is over 250 mm, relation between a lateral deviating distance and By is used for calculating a lateral deviating distance. When a lateral deviating distance is over 500 mm, methods to use a longitudinal magnetic sensor 13 that has the widest detectable range of three magnetic sensors are used for calculating a lateral deviating distance. In each case, the sign of By output signal is used for judging whether a vehicle is running on left side or right side of the centerline.

Of course, in each case, it is possible to obtain a lateral deviating distance only by using the Bx output signal from the longitudinal magnetic sensor 13. The method provides the most important feature of this invention.

(An Example of the Method for Deriving a Lateral Deviating Distance)

An example of the method for deriving a lateral deviating distance by using three magnetic sensors is explained as follows. Here Bx, By and Bz are the longitudinal, transverse and vertical component of the magnetic field, respectively.

First, when a vehicle runs around a lateral deviating distance of 80~100 cm, the Bx output signal is detected and it shows minus sign at first and then get a minus peak, zero and plus peak and successively decreases to be zero. Similarly, the By output signal is detected and it shows plus or minus when a vehicle is running on the left or right side from the magnetic marker 3, respectively. The By output signal shows zero when a vehicle is running on the centerline.

When a lateral deviating distance becomes shorter, it is natural that the Bx output signal and the By output signal increase.

The Bz output signal starts to be detected as short as a lateral deviating distance of 25 cm. As the distance becomes shorter, the Bz output signal becomes larger.

Variations of Bx and By output signals are found out to be detectable in the area that the lateral deviating distance is shorter than 1 m. And that of the Bz output signal is found out to be detectable in the area that the lateral deviating distance is shorter than 25 cm. The Bz output signal is largest near a magnetic marker; Bx and By output signals shows zero just over the center of a magnetic marker.

The Bz output signal shown in FIG. 3 gets maximum value when a lateral deviating distance is zero, that is, the magnetic sensor 1 is just above the center of a magnetic marker 3.

FIG. 4 shows the By output signal of one side at the moment when a magnetic sensor passes through the side of the marker.

The By output signal gets plus value in the left side, minus value in the right side and 0 at the center of the lane, respectively. As the magnetic sensor 1 goes out to the outside from the magnetic marker 3, the value of the By output signal approaches to plus or minus peak, and then gradually approaches to zero. It becomes zero when the distance from a magnetic marker 3 is about 1 m. Whether a vehicle is placed in the left or right side of the lane is judged by using the sign of the By output signal, because it is plus in the left side and minus in the right side in this case.

The relation between a variation of the Bx output signal and a longitudinal distance from a magnetic marker 3 when a magnetic sensor 1 passes through just the center of the magnetic marker 3 is same to the relation between a variation of the By output signal and a lateral deviating distance at the moment when a magnetic sensor 1 goes across a magnetic marker 3.

Provided a lateral deviating distance is constant, the By output signal gets maximum value (Bymax) when a magnetic sensor 1 is placed just beside a magnetic marker 3. But the By output signal keeps zero provided a lateral deviating distance is zero.

Similarly, provided a lateral deviating distance is constant, the Bz output signal gets maximum value (Bzmax) when a magnetic sensor 1 is placed just beside a magnetic marker 3.

However, provided a lateral deviating distance is constant, the Bx output signal gets minimum value (minus peak value) at a certain position ahead a magnetic marker 3, gets zero over or beside a magnetic marker 3 and gets maximum value (plus peak value) at a certain position behind a magnetic marker 3.

Here Bxmax is defined as the gap between the maximum value of Bx and the minimum value of Bx. Lx is defined as the distance obtained by multiplying a vehicle's speed together with the period from the minus peak time to the plus peak time of Bx output signal. Lx corresponds to the longitudinal distance between the point in which the Bx output signal gets maximum value and the point in which the Bx output signal gets minimum value.

The following is an explanation for the characteristics of above-mentioned Bxmax, Bymax and Bzmax.

Bzmax value is largest near a magnetic marker 3 of three kinds of output signal, so that the computer can calculate the position of the centerline by using Bzmax with the highest accuracy. But the detectable range of Bzmax is narrow. Moreover, Bzmax has bilateral symmetry, so whether a vehicle is placed in the right side or the left side cannot be judged from Bzmax.

Using By gives the wide detectable range of a lateral deviating distance and whether the left side or the right side can be judged. However, Bymax value is zero both in the center and the area in which a lateral deviating distance is longer than 1 m. So it is impossible to distinguish whether a vehicle is placed in the center or out of 1 m.

Using Bxmax also gives the wide detectable range of a lateral deviating distance. And Bxmax value becomes larger as a lateral deviating distance is shorter. But similar to the case using Bzmax, whether in the left side or the right side cannot be judged.

The detectable range of a lateral deviating distance is limited to 25 cm in the conventional detecting method to use the combination of Bymax value and Bzmax value. The invented method to use the combination of Bxmax value and Bymax value can widen the detectable range of a lateral deviating distance to 1 m.

In addition, Bx (the longitudinal component of the magnetic field) changes its polarity when a vehicle passes through a magnetic marker 3. From this property of Bx, an external noise can be easily corrected, as mentioned later.

(The Correction of the Height of the Magnetic Sensor in Detecting a Lateral Deviating Distance)

When a vehicle drives with high speed, the detected values of the magnetic field change due to the fluctuation of the height of the magnetic sensor. This fluctuation can be corrected using the dependency of Bx, By and Bz to the height as shown in two-dimensional maps of FIG. 6 and FIG. 8. The correction of the height is explained as follows.

In the case of shorter than 25 cm in the lateral deviating distance, the height of the magnetic sensor 1 can be corrected using the two-dimensional relationship shown in FIG. 6 and the corrected lateral deviating distance can be derived. The rate of the Bz output value to the By output value is independent from the height of the magnetic sensor 1 but is dependent on the lateral deviating distance. Therefore this rate can give the real lateral deviating distance after correcting the fluctuations of the height of the magnetic sensor 1.

In the case of 25~50 cm in a lateral deviating distance, the height of a magnetic sensor 1 can be corrected using the two-dimensional relationship between Bx output value and By output value shown in FIG. 8 and the corrected lateral deviating distance can be derived.

The rate of the By output value to the Bxmax value is dependent on a lateral deviating distance but is independent of a height of a magnetic sensor 1. Therefore this rate can give the real lateral deviating distance after correcting the height of the magnetic sensor 1.

Figure 13:
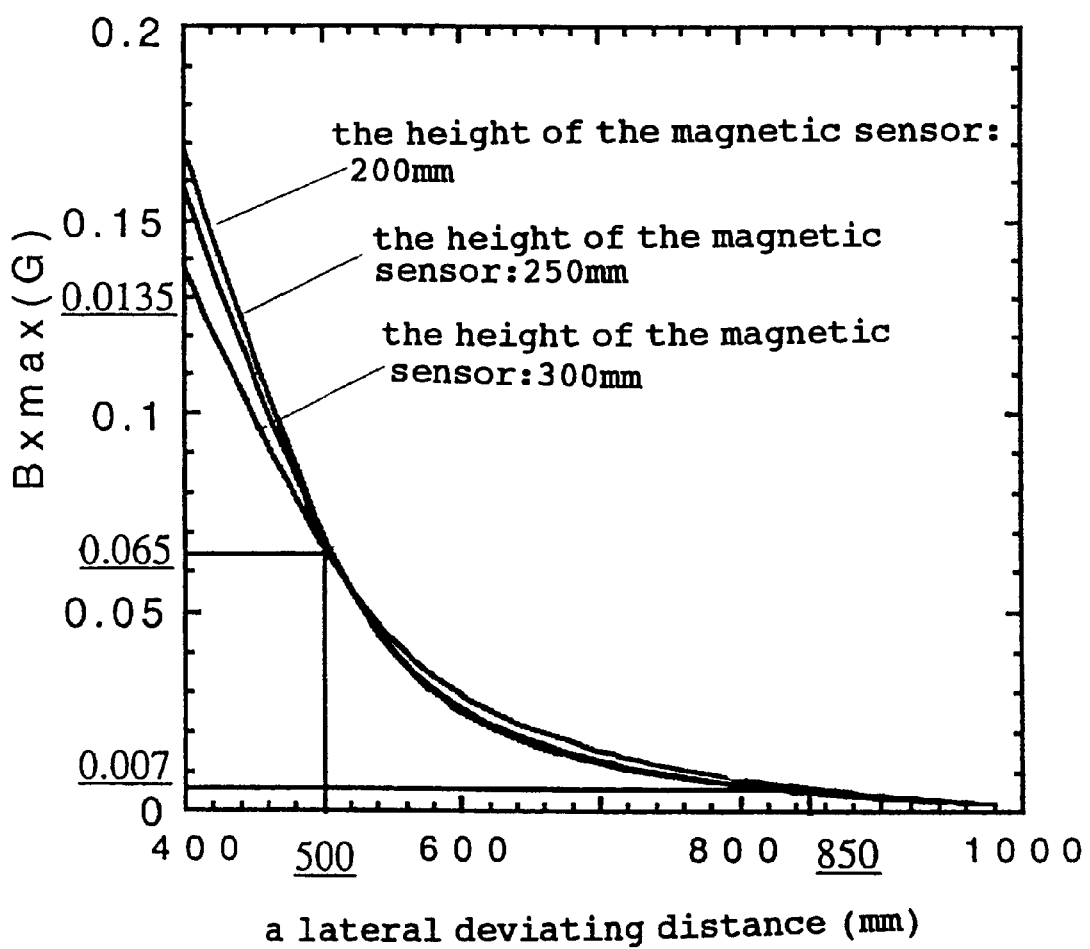
FIG. 13 shows the result of measuring a relationship between a lateral deviating distance and Bxmax, in the case of a lateral deviating distance from 400 mm to 1000 mm.
Figure 14:
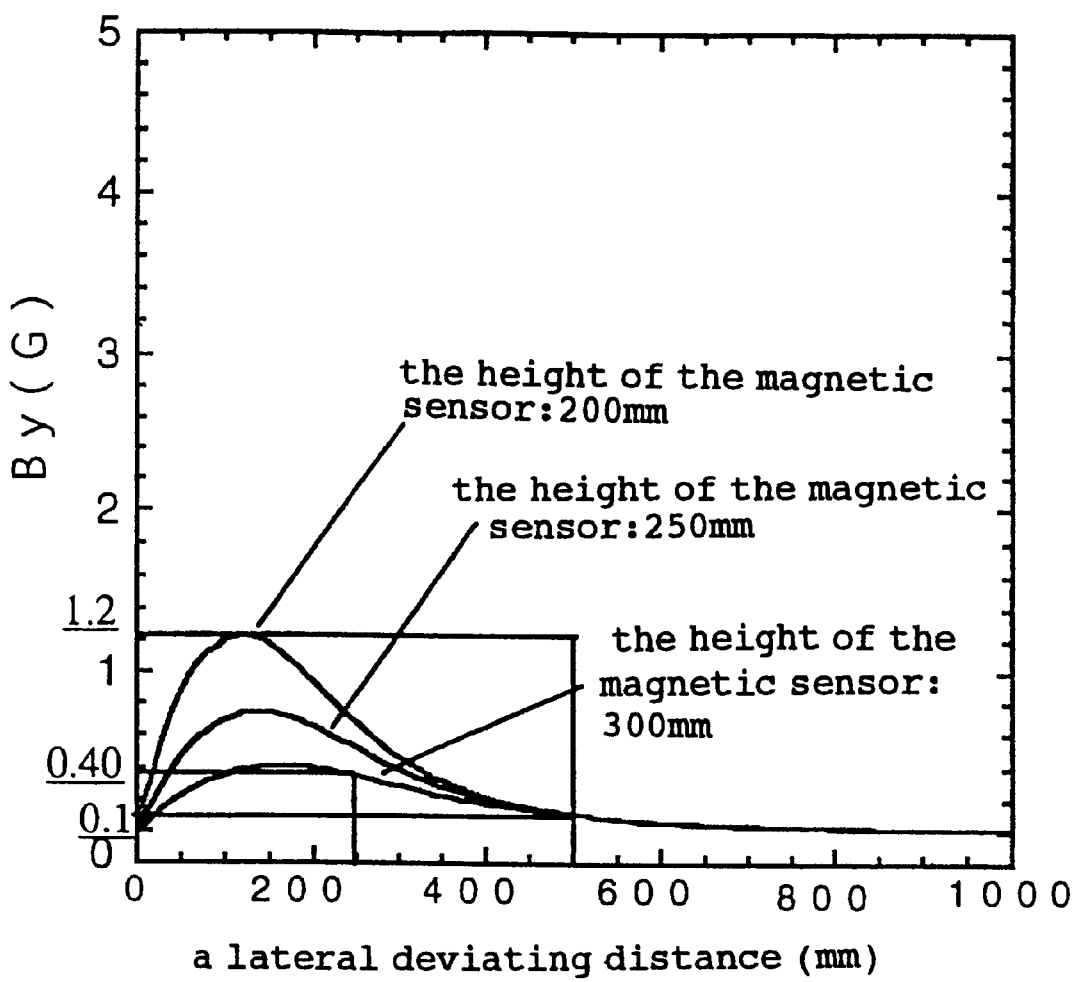
FIG. 14 shows the result of measuring a relationship between a lateral deviating distance and By, in the case of a lateral deviating distance from 0 to 1000 mm. By is the transverse component of the magnetic field.
Figure 15:
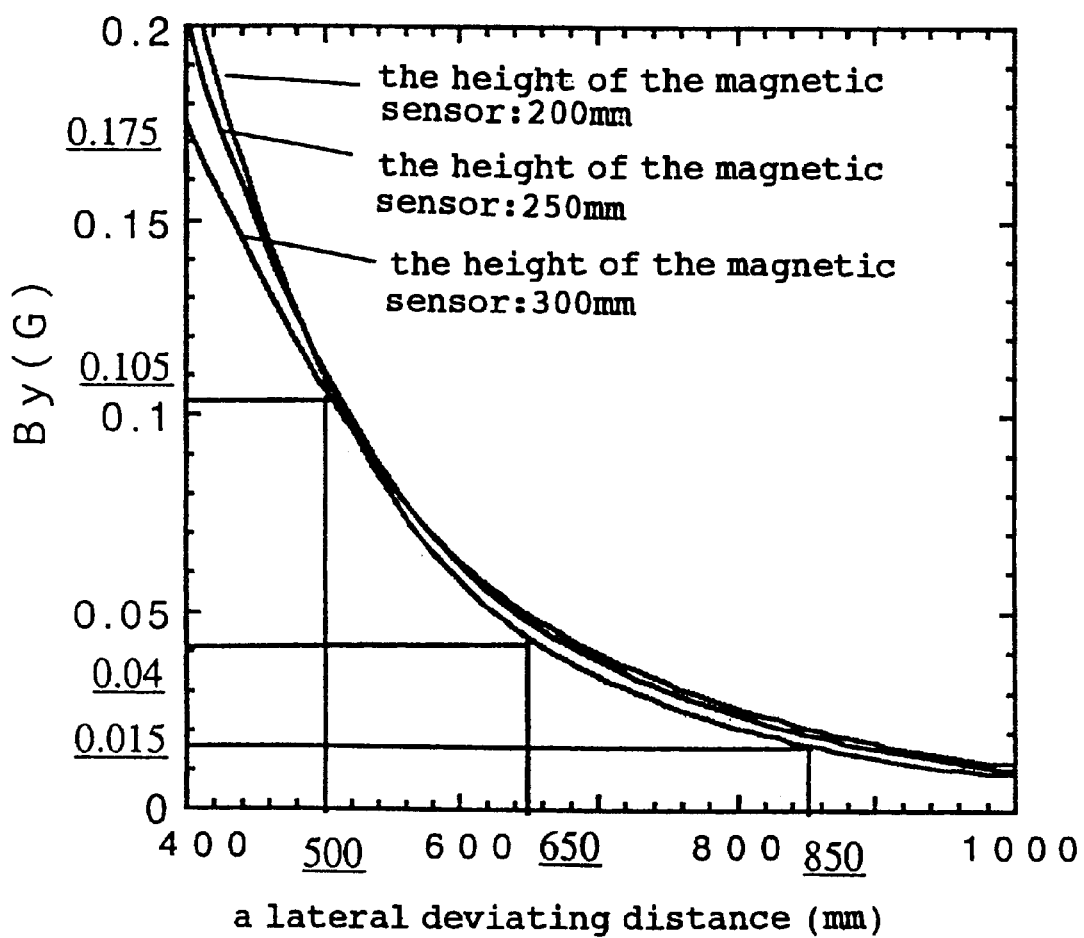
FIG. 15 shows the result of measuring a relationship between a lateral deviating distance and By, in the case of a lateral deviating distance from 400 mm to 1000 mm.
Figure 16:
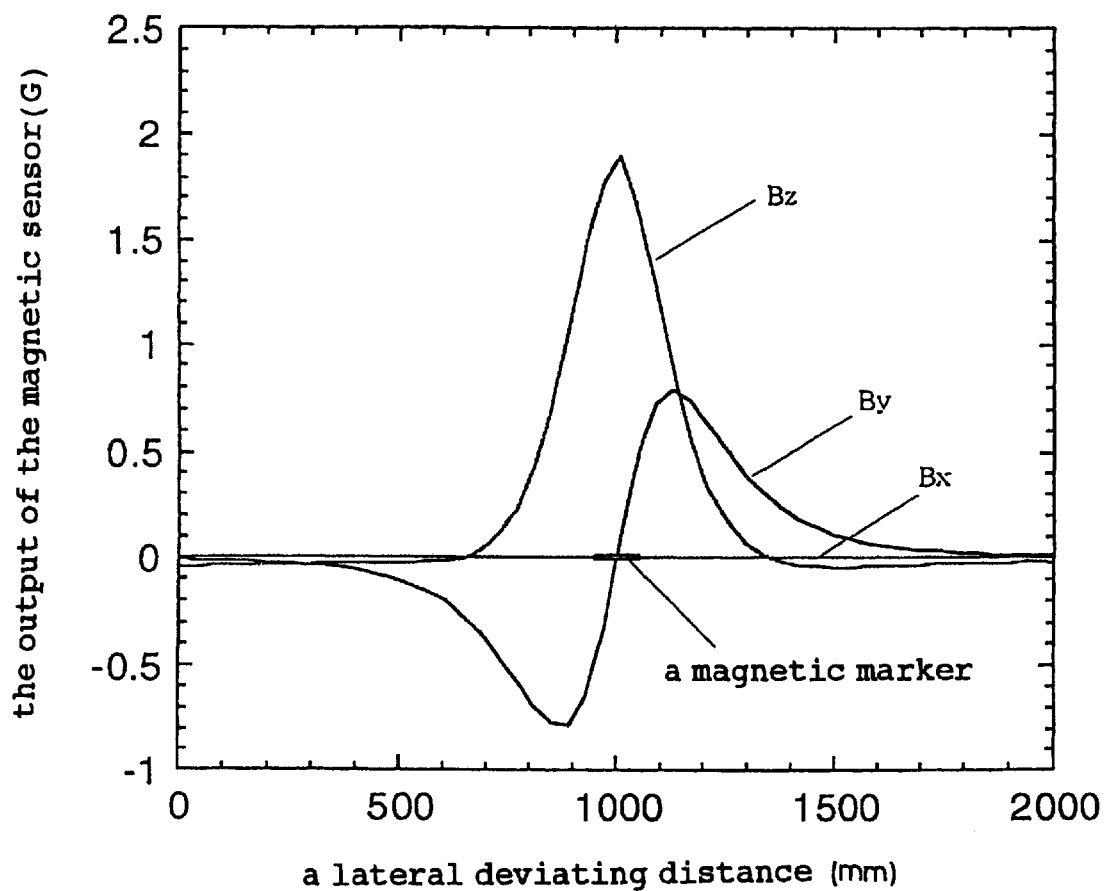
FIG. 16 shows a relationship between a lateral deviating distance and three output voltages of three magnetic sensors at the moment when a vehicle passes through a magnetic marker. These three sensors detect Bx, By and Bz, respectively.

In the case of 50~100 cm in the lateral deviating distance, the corrected lateral deviating distance can be obtained from Bxmax value. In this case, the distance between a magnetic sensor 1 and a magnetic marker 3 is so long that little or no affect of the height of the magnetic sensor 1 is made as shown in FIG. 13. In this Example (1), the lateral deviating distance is calculated by the next equation.

$$(A\ lateral\ deviating\ distance) = 1.85 * Bxmax - 390$$

Here, Bxmax is measured by the unit of Gauss, that is, 0.0001 Tesla.

In addition, as seen in FIG. 4, using By output value can derive a lateral deviating distance. So it is possible to use an average of two derived lateral deviating distances as the final lateral deviating distance, where one is derived from Bxmax and the other is derived from By. However, it is preferable to use Bxmax, because By takes more affect given by external magnetic noise than Bxmax.

Correction for magnetic noise brought by the external magnetic field is explained as follows. Main external magnetic noises are terrestrial magnetism and magnetic field induced by iron-made building such as bridges, tunnels and buildings. These noises are classified into three kinds according to their periodicity. One is a long period external magnetic field that has a longer period than 2 m. Another is a short period external magnetic field that has a shorter period than 2 m. The other is a superposition of both types of their fields.

First, correction for longitudinal magnetic noises is explained.

The sign of Bx output signal is changed at the interval of 2 m, that is, the location interval between a magnetic marker and neighbor one. And Bx spreads widely enough to be detected by the sensor wherever the vehicle runs on the lane. Thus Bx signal is more preferable to distinguish signal from noises than other two signals of By and Bz.

In the case of a long period external magnetic field, the intensity of the external magnetic field is nearly equal on the area between two neighboring magnetic markers 3. So the Bx output signal value at the middle point between two neighboring magnetic markers 3 can be regarded as the value of the magnetic noise, because there are little or no intensity of magnetic markers at the middle point. The real output signal value of Bx in this area is obtained with subtracting this value of noises from the raw output signal value of Bx. And then the Bxmax value is calculated from difference between the maximum and the minimum of the Bx output signal value and shows a lateral deviating distance. This value is independent from this kind of noise and offers simple correction. In addition, it is possible to use an average of a few calculated Bxmax values for enhancing the accuracy.

In the case of a short period external magnetic field, another method for correction is needed. The computer calculates the period of the Bx signal using the interval of two neighboring magnetic markers 3 and the speed of a vehicle. Different periods of the Bx signal are regarded as noise and are removed from the Bx signal. However this correction method needs to detect some or many Bx values continuously and to analysis the period by computer.

In the case of an external magnetic field superposed with long and short periods, which is actual case, two correction methods mentioned above are used in combination. Short period external magnetic fields are removed with using software to analysis period of the Bx signal. And then long period external magnetic fields are removed with taking difference between the maximum and the minimum of the Bx output signal or with values detected at the middle point.

Next, correction for vertical magnetic noises is explained.

In the case of the lateral deviating distance of shorter than 25 cm, the Bz output signal obtained over the center of the magnetic marker is large. So Bz signal is most preferable to keep a vehicle at or near the center of the lane by computer. But if there are some kinds of magnetic noises, correction for the Bzmax output signal value is necessary or important, because the Bz output signal is sensitive to external magnetic noises.

In the case of the lateral deviating distance of shorter than 25 cm, the Bz signal shows enough large output value and a constant period dependent on the interval of two neighboring magnetic markers 3 and the speed of a vehicle. Short period external magnetic fields can be removed with differences in frequency in the similar manner to the case of Bx. Of course, it is needed to detect plural Bz values continuously.

Long period external magnetic field can be removed with subtracting noise defined as Bzm from the signal of Bz0, where Bzm is defined as the Bz signal value at the middle point of two neighboring magnetic markers 3 and Bz0 is defined as the Bz signal value at the moment when the Bx signal value gets zero during variation from minus to plus. For enhancing the accuracy of detecting, it is possible to use an average of several detected values.

Next, correction for transverse magnetic noises is explained.

Figure 21:
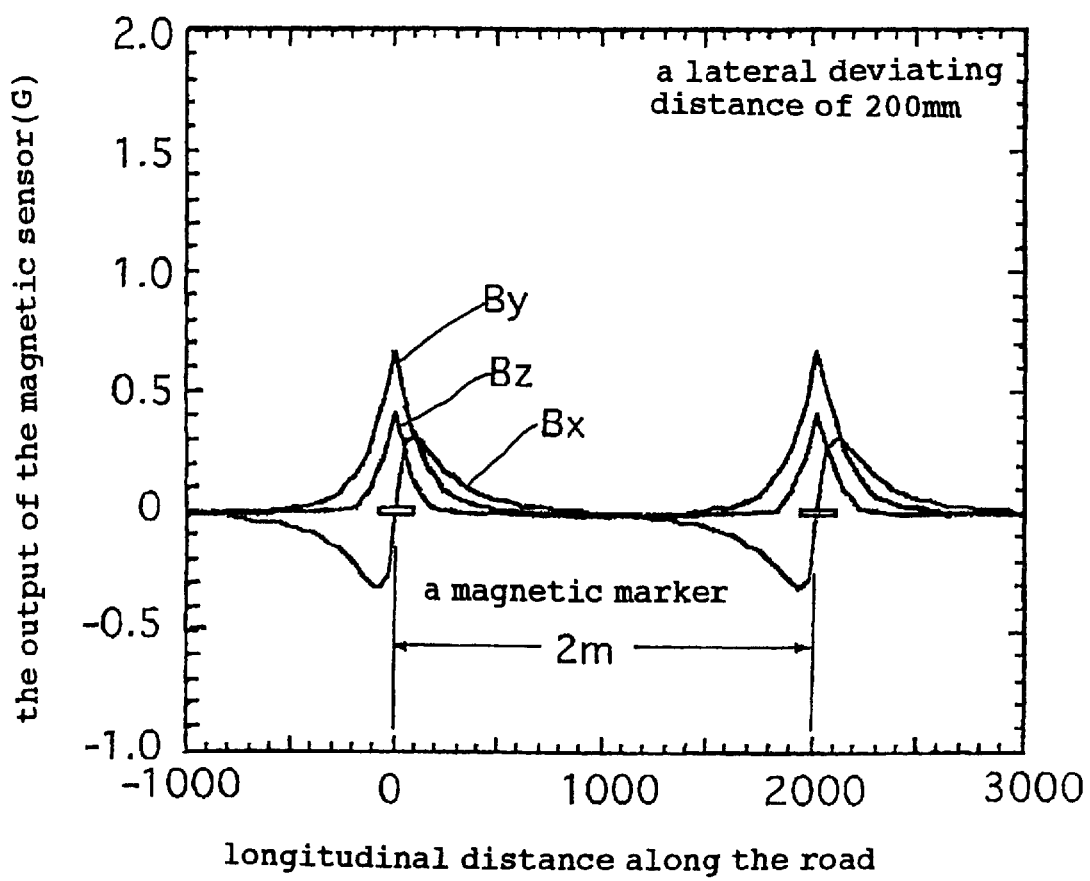
FIG. 21 shows output signals of three magnetic sensors, in the case that a vehicle is running with keeping a lateral deviating distance of 20 cm to the right.
Figure 22:
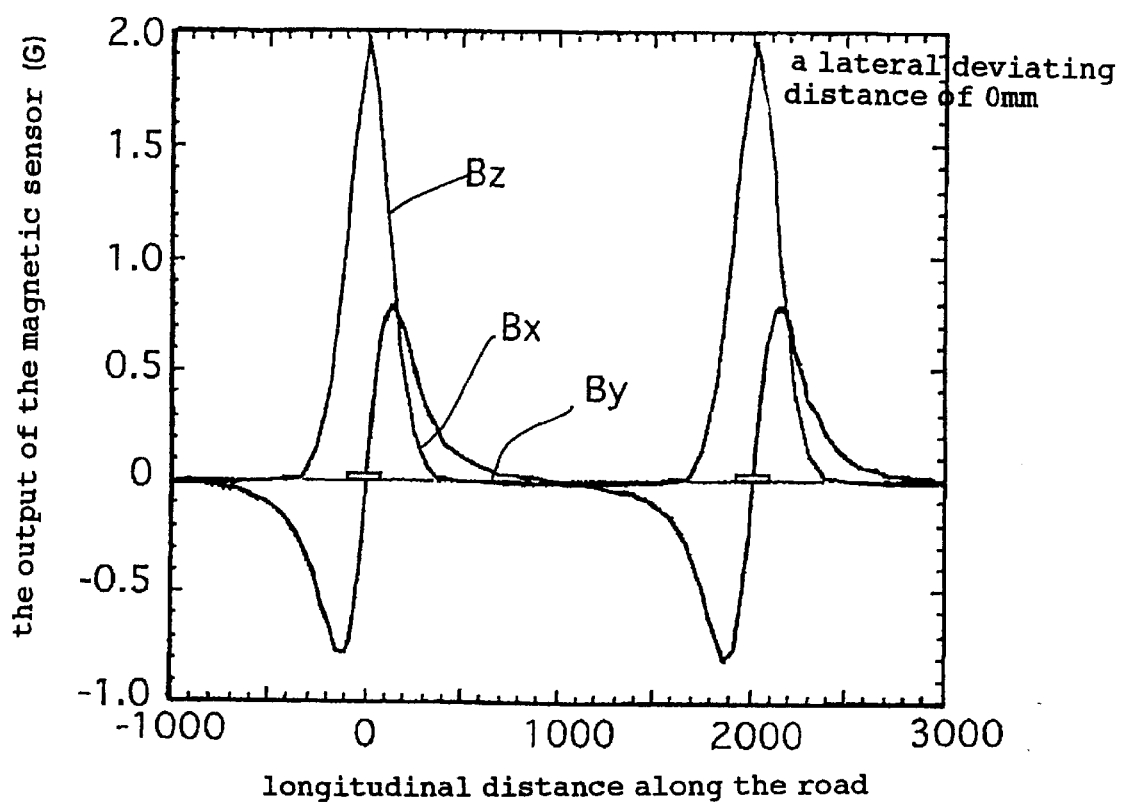
FIG. 22 shows output signals of three magnetic sensors, in the case that a vehicle is running along the centerline.
Figure 23:
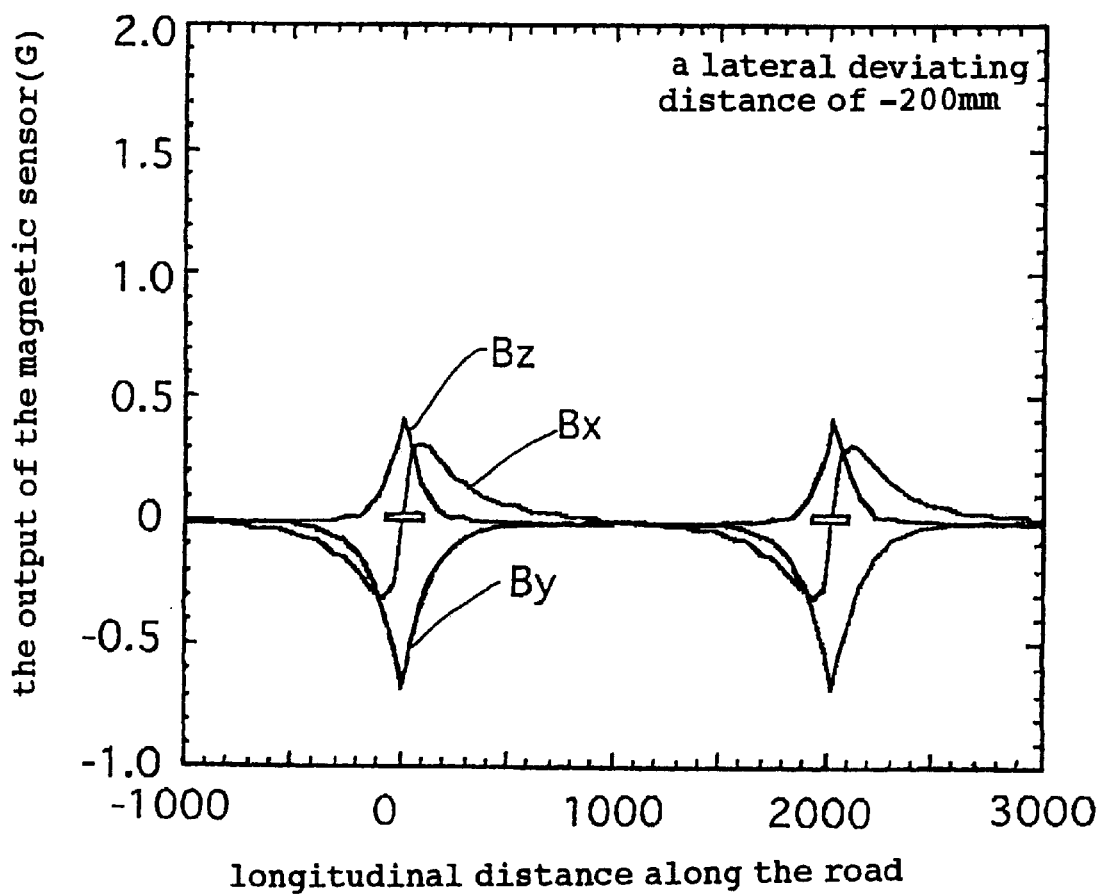
FIG. 23 shows output signals of three magnetic sensors, in the case that a vehicle is running with keeping a lateral deviating distance of 20 cm to the left.

The magnetic field of By produced from the magnetic marker spreads as far as about 1m, similar to the magnetic field of Bx. And in the case of a lateral deviating distance of longer than 15 cm, the By output signal has one to one relation with the lateral deviating distance similar the Bz output signal as shown in FIGS. 21 and 23. So in this case the transverse noises can be treated in the same manner of vertical ones.

Giving consideration to security, it is most important how to catch magnetic markers 3 certainly. Among three kinds of signals, only the Bx output signal has a notable feature that the sign of the signal changes from minus to plus at the center of the magnetic marker 3. Therefore the Bx output signal is the best signal to confirm a position of magnetic markers 3. In addition it has a frequency dependent on the interval of the location of magnetic markers 3.

In one word, the method to use By and Bz signals besides the Bx signal in combination enables to calculate a lateral deviating distance within about 1 m. Even if a vehicle largely deviates from the centerline, the vehicle is certainly guided by using the combination of Bx and By signals. After the vehicle has been guided around the center, it is certainly kept near or on the center against large and complex magnetic external noises by using three signals of Bx, Bz and By signal. It means that the vehicle can be guided around the center and runs safely under automation even if there are strong and complex magnetic external noises produced from bridges, tunnels and so on.

A concrete traffic case is discussed. If a vehicle is running with a lateral deviating distance of 20 cm, the magnetic sensor misses three magnetic markers due to the large external magnetic noise occurred from the tunnel or like one and the vehicle runs out of control, going outside of the road to hold the maximum steering angle of 5 degrees, the vehicle will deviate about 50 cm from the center after passing three magnetic markers. If the magnetic sensor has only the detectable range of 30 cm~50 cm, the vehicle falls out or control. However if the magnetic sensor has the wide detectable range of about 1 m, even in this case, the vehicle can run under control because the present system can correct noises to calculate a lateral deviating distance during the time and start to guide a vehicle.

In the case that a vehicle is running around the center, a position of a magnetic marker 3, in other words, a lateral deviating distance is certainly detected because both Bx and Bz signals shows oscillating larger values. And when a magnetic sensor 1 passes through a magnetic marker 3, the present system guides the vehicle to the center promptly according to a lateral deviating distance because the present system uses only one to one correspondence. This high response of the system is especially effective in curves. The conventional method needs a rather long time to calculate a lateral deviating distance after a magnetic sensor passes through a magnetic marker, in other words, it has poor response. So the conventional system requires shortening an interval of magnetic markers from 2 m to 1 m.

(The Example of the Control Action)

Figure 17:
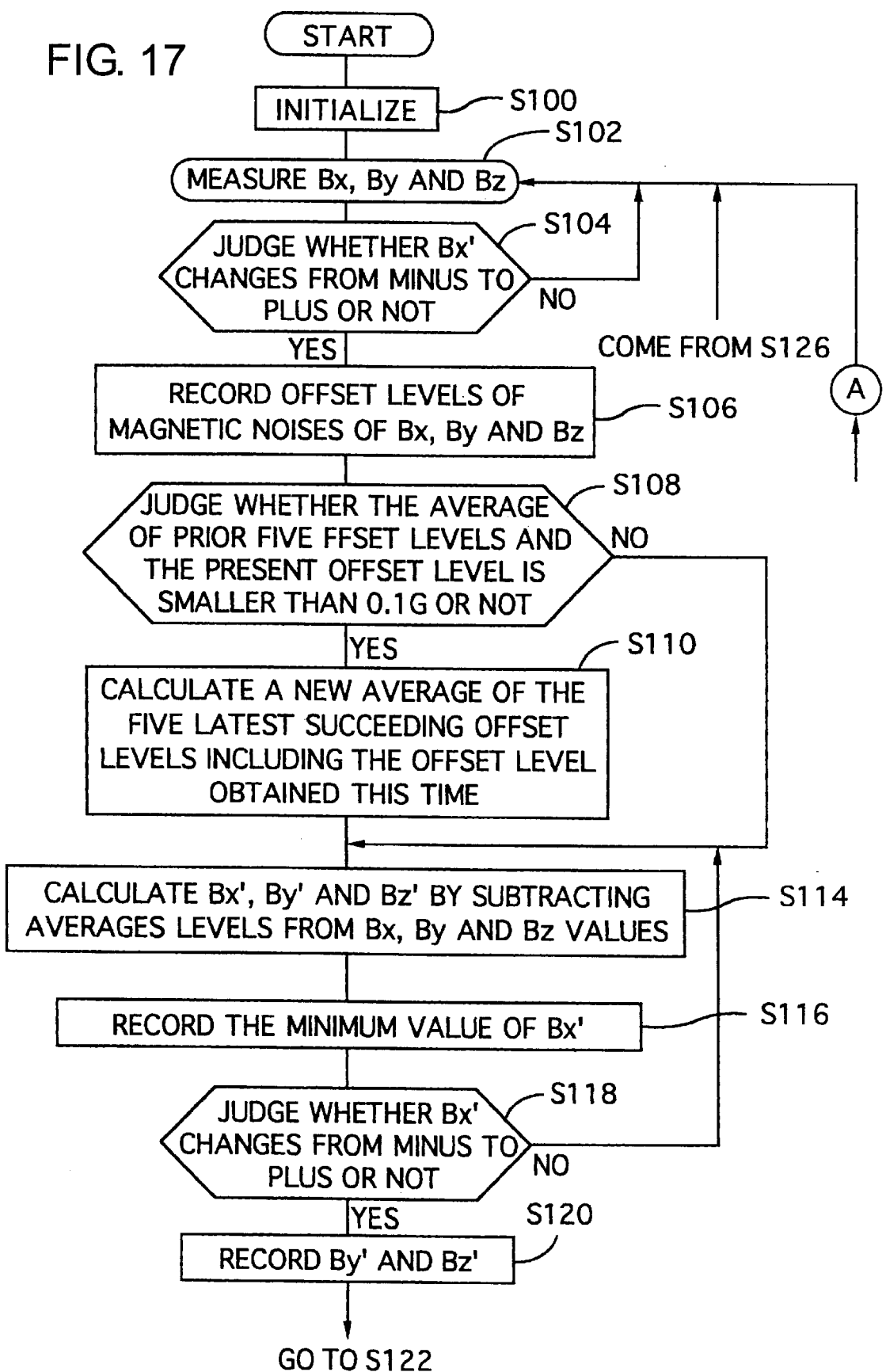
FIG. 17 is the former half of the flow chart showing the program control used by the computer 2 in example (1).
Figure 18:
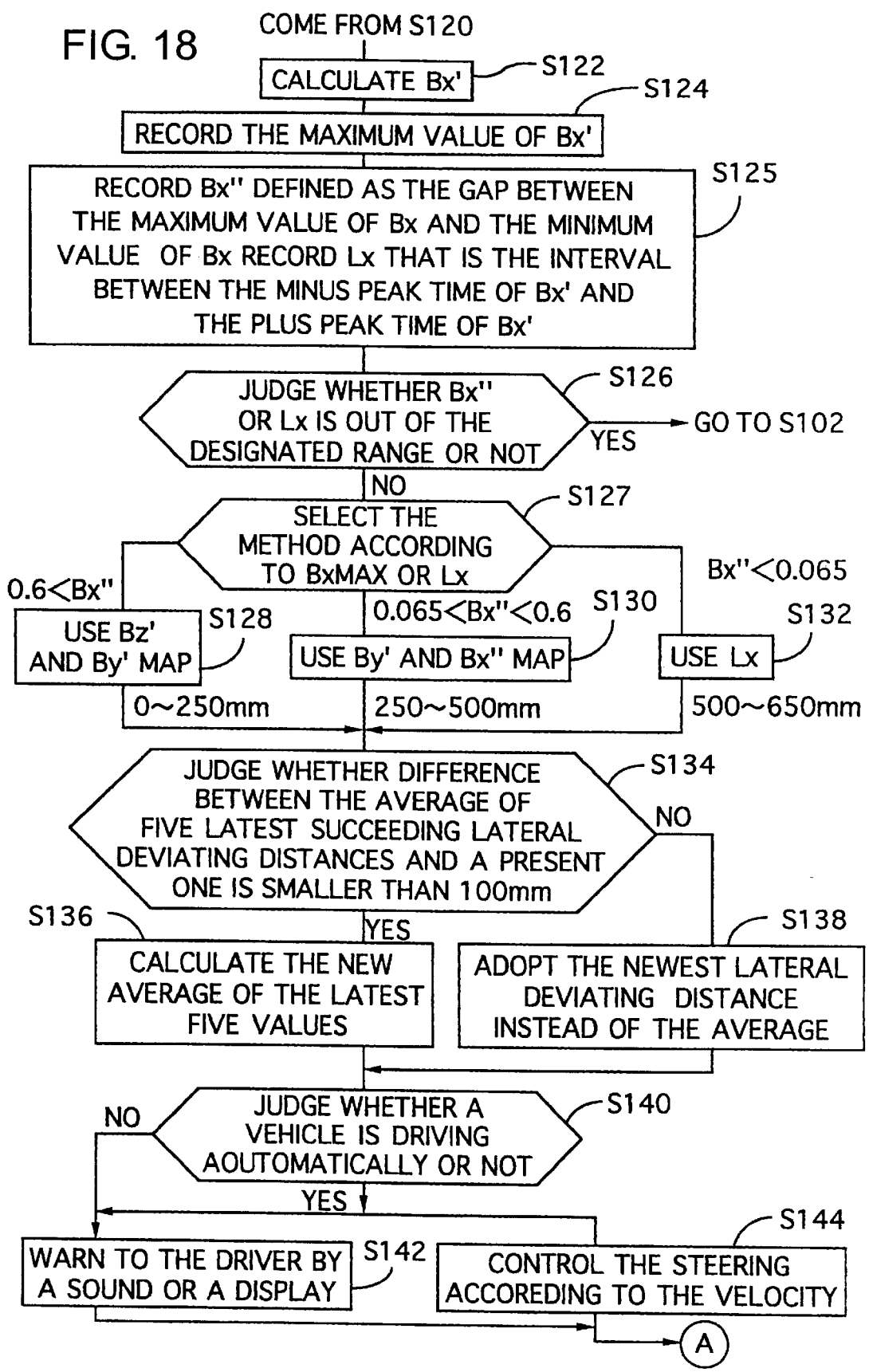
FIG. 18 is the latter half of the flow chart showing the program control used by the computer 2 in example (1).

The procedure of above-mentioned detecting actions is concretely explained, referring to flow charts shown in FIGS. 17 and 18.

First, the system starts to work by switching on the electric source and is initialized (S100). And the system loads initial detected values of Bx(t=0), By(t=0) and Bz (t=0) derived from output signals of magnetic sensors 11~13 (S102).

Then the system judges whether there is the moment at which the sign of Bx' changes from minus to plus and confirms that a magnetic marker 3 exists around the sensor (S104). Here Bx' is defined as a component of difference of the detected Bx value−Bx(t=0). By the way By' and Bz' is defined in the same manner of above-mentioned Bx' .

Then the system calculates the period between the above-mentioned moments at which the sign of Bx' changes from minus to plus, corresponding to two neighboring magnetic markers. The system calculates the middle time based on this period, that corresponds to the middle point of two neighboring magnetic markers 3. Then the system records Bx, By and Bz values detected at the middle time as present offset levels of magnetic noises (S106).

Then the system checks whether the difference between the average of prior five offset levels and the present offset level is smaller than 0.1 G or not (S108).

If this difference is smaller than 0.1 G, the system goes to S114 without changing an old average. On the other hand if this difference is larger than 0.1 G, the system calculates a new average of the five latest succeeding offset levels including the offset level obtained this time (S110).

Next the system calculates Bx' , By' and Bz' by subtracting above-mentioned three average levels from detected Bx, By and Bz values (S114).

In this way, Bx, By and Bz values at the middle point of two neighboring magnetic markers 3 are regarded as magnetic noises caused by the terrestrial magnetism and long period external magnetic fields originated in bridge, tunnel and so on. Thus subtracting these values from detected Bx, By and Bz values can cancel magnetic noises.

Then the system records the minimum value of Bx' (S116). And at the moment when the sign of Bx' changes from minus to plus, the system judges that a vehicle passes through a magnetic marker 3 (S118). If a vehicle does not pass synchronously with the above-mentioned period, the process returns to S114.

If a vehicle has passed through a magnetic marker, the system goes to next step and records By' and Bz' value at the moment when a vehicle passes through a magnetic marker (S120).

Then the system calculates and records the maximum value of Bx' (S122, S124).

Then the system calculates Bxmax by subtracting the Bx' minimum value from the Bx' maximum value and records the value Bxmax. At the same time, the system calculates Lx by multiplying the interval between the minus peak time of Bx' and the plus peak time of Bx' by a vehicle's speed detected by another method separately (S125). In addition, Bx' max is shown as Bx" in the flow charts. And T means tesla that is the unit of intensity of a magnetic field.

If the calculated value of Bx" or Lx is out of the designated range recorded in advance, the system judges that it is out of control because of some reasons, such as the still large longitudinal magnetic noises and returns to S102 (S126).

Then the system selects the appropriate method according to the values of Bxmax or Lx from the following three methods (S127).

In the case that Bxmax (Bx") is larger than $0.6 \times 10^{-4}$ T, the system judges that a vehicle is near the center. And the system calculates a lateral deviating distance of 0~25 cm by using built-in data maps that shows relation between a lateral deviating distance and Bz' or By' (S128).

In the case that Bxmax (Bx") is $0.065 \times 10^{-4}$~$0.6 \times 10^{-4}$ T, the system judges that a lateral deviating distance is 25~50 cm. And the system calculates a lateral deviating distance of 25~50 cm by using built-in data maps that show relation between a lateral deviating distance and Bx' or By' (S130).

In the case that Bxmax (Bx") is smaller than $0.065 \times 10^{-4}$ T, the system judges that a lateral deviating distance is larger than 50 cm. And the system calculates a lateral deviating distance of 50~100 cm by using built-in maps or the fixed equation that show the relation between a lateral deviating distance (S132).

Next the system calculates the difference between the average of five latest succeeding lateral deviating distances and a present lateral deviating distance obtained at this time (S134).

If the difference is smaller than 100 mm, the system calculates the average using the five values of lateral deviating distances including one obtained this time (S136).

If the difference is larger than 100 mm, the system does not calculate the new average in above-mentioned manner but records this newest lateral deviating distance obtained this time instead of the above-mentioned average of five values (S138). The reason is that when the system uses average of five lateral deviating distances, the system is apt to estimate a lateral deviating distance smaller than the real one. And the system goes to next step of S140.

Then the system judges whether a vehicle is driving automatically or not by using the signal offered from ECU of the vehicle (S140).

If a vehicle is driving automatically, the system outputs the signal of the present lateral deviating distance to ECU and controls the steering to decrease this lateral deviating distance toward the center of the road (S144). In addition in the case that a lateral deviating distance shows large, the system warns to the driver by a sound or a display on a driving sheet (S142). If a vehicle is not driving automatically, the system does not control the steering but makes only a warning.

(A Modulation of the Control Action)

Figure 19:
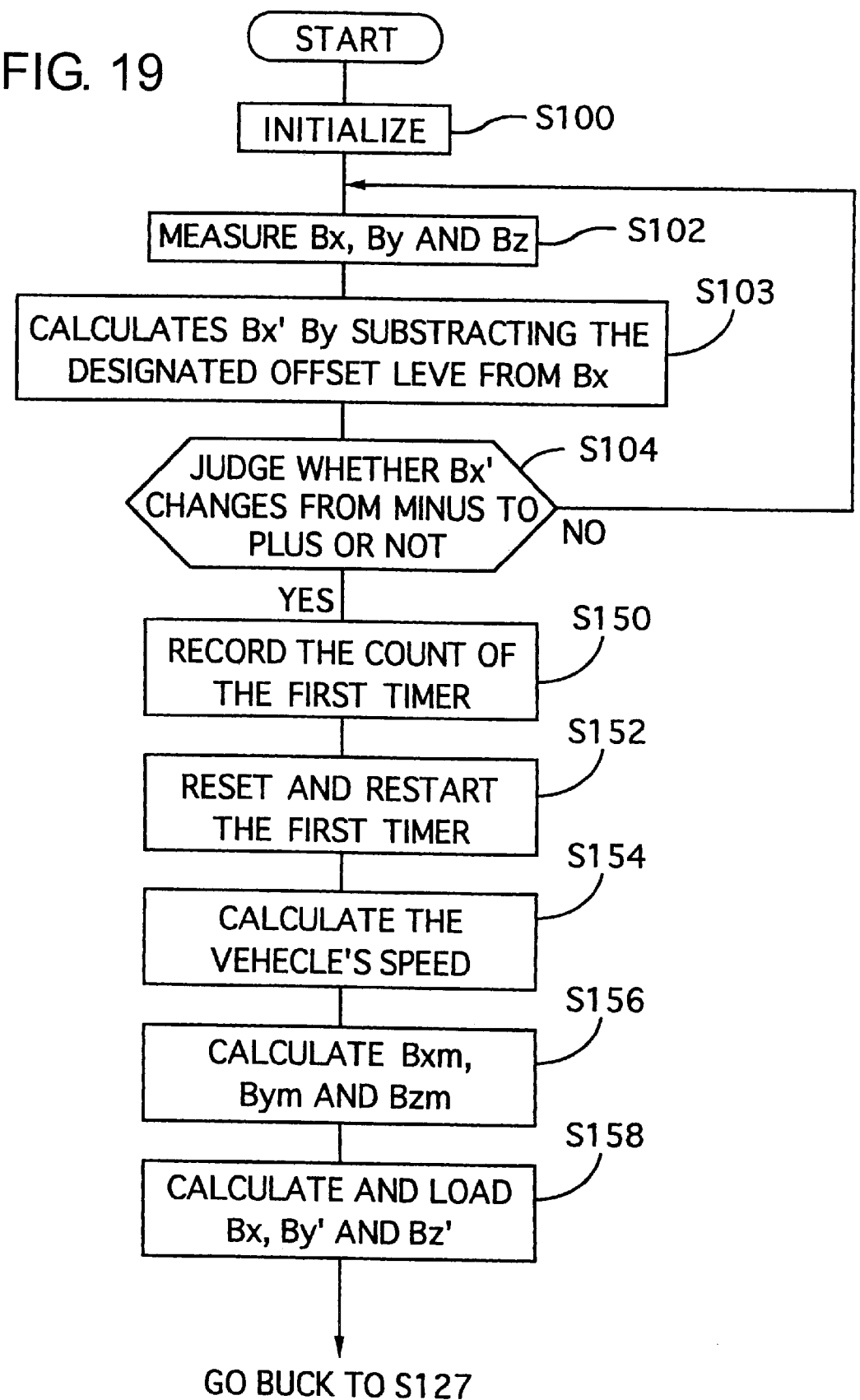
FIG. 19 is the former half of the flow chart showing the altered program control used by the computer 2 in example (1).
Figure 20:
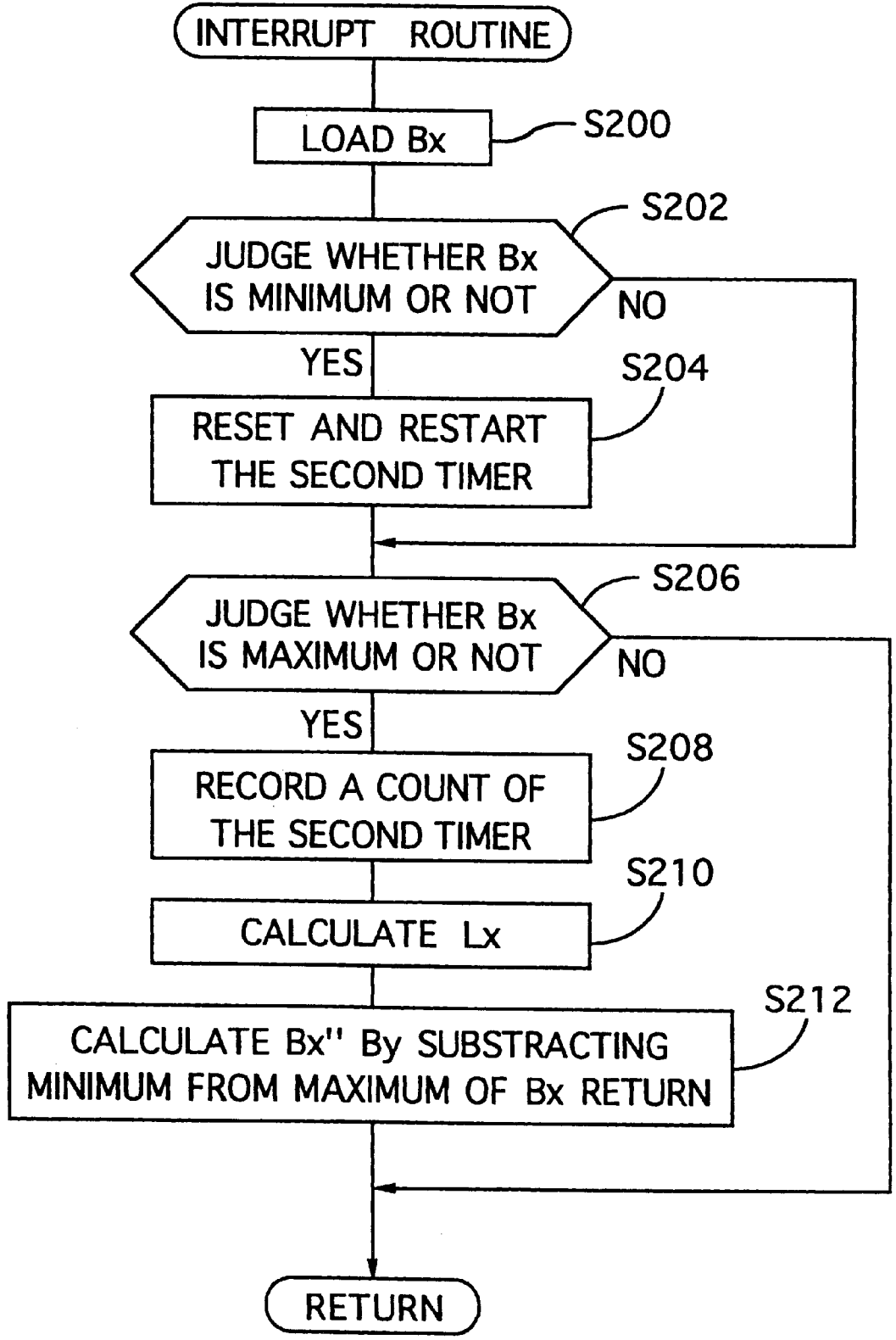
FIG. 20 is the latter half of the flow chart showing the altered program control used by the computer 2 in example (1).

A modulation of the control action has steps shown as S100~S127, referring to FIGS. 19 and 20.

In this control, the interrupt routine 212 is operated repeatedly at the short-time interval as shown in FIG. 20. So the interrupt routine 212 is explained at first.

First, the Bx value is inputted to the system (S200) and the system checks whether inputted Bx is minimum or not (S202). This detecting is done within the period when a differential coefficient of Bx changes from minus to plus. For avoiding misjudgment from noises of high frequency, it is desirable to remove components of high frequency in advance by using a low-pass filter equipped in software or hardware.

If the system detects the minimum value of Bx in step named as S202, the system resets the second timer and restart (S204). Otherwise the system goes to S206 jumping S204.

Then the system checks whether inputted value of Bx is maximum or not (S206), similarly to the above method to check the minimum of Bx.

If the system detects the maximum value of Bx in S206, the system goes to S208. Otherwise the system returns to the main routine shown in FIG. 19.

The system examines the interval time between the minus peak time of Bx and the maximum peak time of Bx measured by a count of the second timer and records it (S208).

After Lx is calculated by multiplying the interval time by a vehicle's speed (S210) and the Bxmax (Bx") is calculated by the gap of Bx maximum and minimum values (S212), the system returns to the main routine.

Here it is pointed out that Bx shows minimum in front of the magnetic marker 3 and maximum behind the magnetic marker 3.

Next, an example of control action simplifying the flow chart shown as S100~S127 in FIGS. 17 and 18 is shown in FIG. 19. After loading Bx, By and Bz in S102, the system calculates Bx' (S103) by subtracting the designated longitudinal offset level from the measured Bx value. After that the system checks whether there exist the moment when Bx' shows zero from minus peak to plus peak or not, in other words the system checks whether the vehicle is placed equal to the position of magnetic marker 3 or not (S104). If not, the system returns to S102.

If Bx' shows zero, the system records the count of the first timer (S150) and resets the first timer before restarting (S152). The count of the first timer gives the vehicle's speed (S154).

This detecting of a vehicle's speed is done as follows.

The above-mentioned count of the first timer shows the time (T) when the vehicle passes through the interval L between two neighboring magnetic markers 3. This interval L is given as a constant distance, so the vehicle's speed can be calculated as L/T. If adopting other independent speed sensors, the first timer is not needed.

Next, the system calculates longitudinal, transverse and vertical offset levels (Bxm, Bym and Bzm respectively) (S156) by some methods besides the method shown in FIG. 17. Showing an example of calculating Bxm, it is to sum up all Bx maximum and minimum values measured at positions of five succeeding magnetic markers 3 in S202 and S206 and then divide the sum by 5.

Then the system calculates Bx', By' and Bz' (S158) by subtracting the offset level of Bxm, Bym and Bzm from the measured value of Bx, By and Bz loaded in S102 respectively.

(Another Modification of the Control Action)

The information about the form of the road can be obtained by detecting sequence or the interval of magnetic markers 3 and the reversal of polarity in upper face of magnetic makers 3 by magnetic sensors 11~13.

Figure 24:
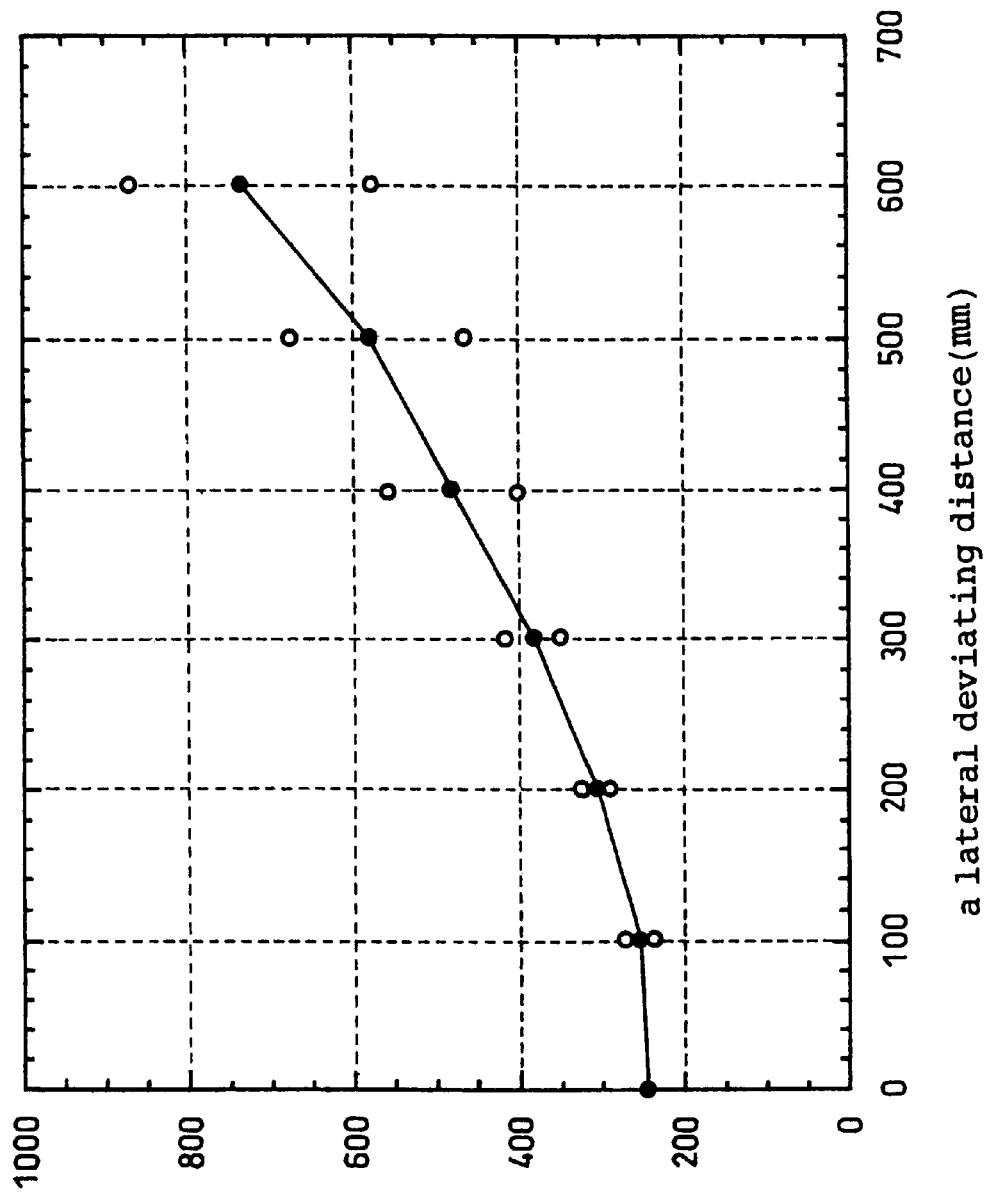
FIG. 24 shows a relationship between a lateral deviating distance and Lx obtained in the experiment.

By the way the actual relation between Lx and a lateral deviating distance is shown in FIG. 24. The measurement of lateral deviating distance is made one time every 10 mm in the case of 0~500 mm. Averages of each measured value are shown as black points and maximum and minimum values are shown as white points. The scattering of measured values is considered to occur due to the noise of the electric circuit.

EXAMPLE (2)

Figure 26:
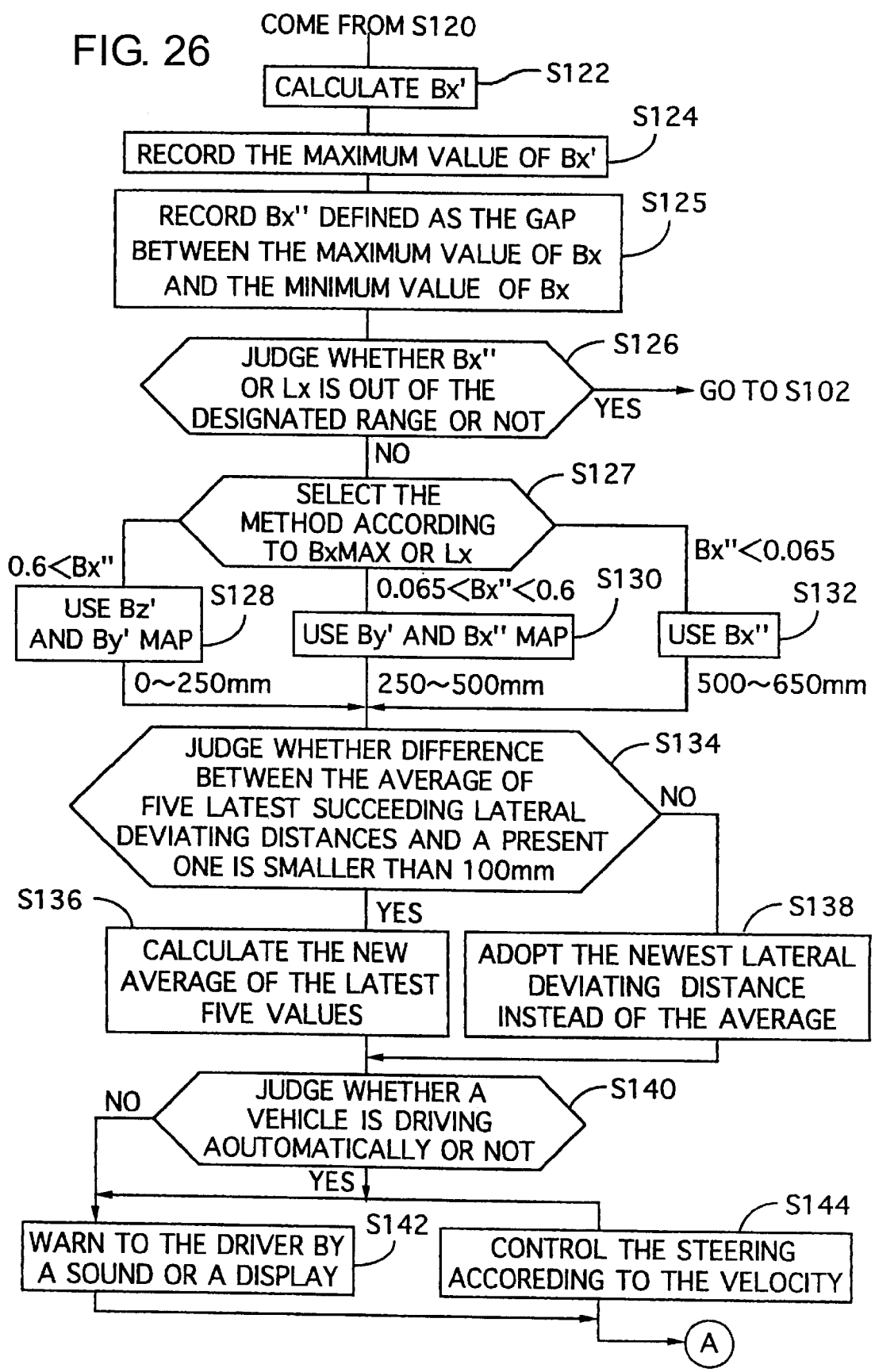
FIG. 26 is the flow chart showing the method to detect a lateral deviating distance in example (2).

The second example to detect a lateral deviating distance is shown in the flow chart of FIG. 26.

Figure 25:
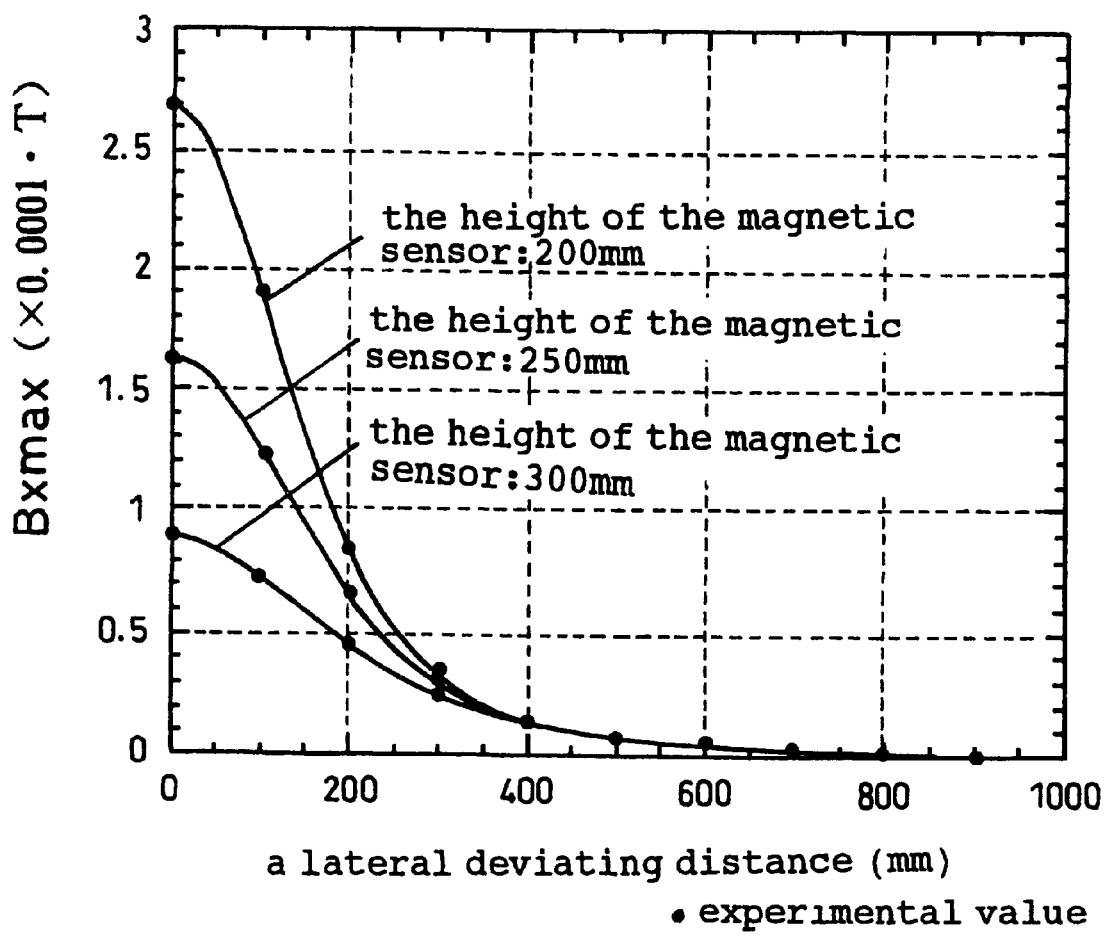
FIG. 25 shows a relationship between a lateral deviating distance and Bxmax obtained in the experiment. As mentioned above, Bxmax is defined as the gap between the maximum value of Bx and the minimum value of Bx.

This Example uses not Lx but Bxmax (Bx") in S132, differing from Example (1). As seen in FIG. 25 that shows experimental data, if a lateral deviating distance is longer than 500 mm, the affect of the height of a magnetic sensor 1 is negligible and there is a nearly linear relation between Bxmax and a lateral deviating distance. Thus in the case that a lateral deviating distance is longer than 500 mm, a lateral deviating distance is easily estimated from a prerecorded formula between Bxmax and a deviating distance (FIG. 25) without correcting a height of a magnetic sensor 1. The experiment is made in same condition to that of FIG. 24.

What is claimed is:

1. Magnetic apparatus to detect a lateral deviating distance from a center of a road for a vehicle running on the road, said magnetic apparatus comprising:

magnetic markers with one pole on a top face placed at designated intervals in the road, one-set magnetic sensors set on the vehicle, and electronic equipment for calculating the lateral deviating distance using a signal of the sensor, wherein the one-set magnetic sensor includes a longitudinal magnetic sensor to detect a longitudinal component of a magnetic field generated and the electronic equipment calculates the lateral deviating distance by using the longitudinal component of the magnetic field in accordance with a relationship between the longitudinal component and the lateral deviating distance.

2. Magnetic apparatus as set forth in claim 1, wherein the lateral deviating distance is calculated by a difference between a maximum value and a minimum value of output signals of the longitudinal magnetic sensor obtained at a moment when the vehicle passes through the magnetic marker.

3. Magnetic apparatus as set forth in claim 1, wherein the lateral deviating distance is calculated by the electronic equipment by an interval between a maximum peak time and a minimum peak time of output signals of the longitudinal magnetic sensor obtained at a moment when the vehicle passes through the magnetic marker.

4. Magnetic apparatus as set forth in claim 1, wherein the one-set magnetic sensors includes both a vertical magnetic sensor which detects a magnetic field and a transverse magnetic sensor which detects a transverse component of the magnetic field as well as the longitudinal magnetic sensor and the lateral deviating distance is calculated by the electronic equipment from a combination of signals.

5. Magnetic apparatus as set forth in claim 4, wherein a vertical signal and a transverse signal are measured at a moment when a longitudinal signal is zero passing through the magnetic markers.

6. Magnetic apparatus as set forth in claim 4, wherein a peak value of a vertical signal and a peak value of a transverse signal are obtained from the vertical magnetic sensor and the transverse magnetic sensor.

7. Magnetic apparatus as set forth in claim 4, wherein in a first condition, the lateral deviating distance is calculated by the electronic equipment based upon a longitudinal signal from the longitudinal sensor and the vehicle running right-or-left is judged by the electronic equipment based upon a transverse signal from the transverse sensor, and in a second condition, the lateral deviating distance is calculated by the electronic equipment based upon a longitudinal output signal from the longitudinal sensor and the transverse signal, and in a third condition, the lateral deviating distance is calculated by the electronic equipment based upon a vertical signal from a vertical sensor and the transverse signal.

8. Magnetic apparatus as set forth in claim 4, wherein frequency bands of noises are removed except frequency bands of effective signals generated by the magnetic markers.

9. Magnetic apparatus as set forth in claim 4, wherein steering of the vehicle is controlled according to the derived lateral deviating distance.

10. Magnetic apparatus as set forth in claim 1, wherein a longitudinal position of the magnetic marker is calculated by using frequency modulation of an output signal from the longitudinal magnetic sensor.

11. Magnetic apparatus as set forth in claim 1, wherein a longitudinal position of the magnetic marker is judged by using peak values of an output signal from the longitudinal magnetic sensor based upon calculation of a middle point between two neighboring magnetic markers and using a signal level at the middle point after removing magnetic noises generated from external magnetic fields.

12. Magnetic apparatus as set forth in claim 1, wherein information about the road is detected by using a variation in positions of the magnetic markers.

13. Magnetic apparatus as set forth in claim 1, wherein a vehicle's speed is calculated by the electronic equipment by using a time when a vehicle passes through an interval of two neighboring magnetic markers.

\* \* \* \* \*